United States Patent
Okada et al.

(10) Patent No.: US 8,488,432 B2
(45) Date of Patent: Jul. 16, 2013

(54) POLYMER COMPOUND, COMPOSITION FOR ALIGNMENT FILM, ALIGNMENT FILM, OPTICAL ELEMENT, AND OPTICAL INFORMATION WRITING/READING DEVICE

(75) Inventors: Satoshi Okada, Chiyoda-ku (JP); Hiroshi Kumai, Chiyoda-ku (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 13/446,117

(22) Filed: Apr. 13, 2012

(65) Prior Publication Data
US 2012/0269050 A1 Oct. 25, 2012

(30) Foreign Application Priority Data
Apr. 19, 2011 (JP) ................. 2011-093096

(51) Int. Cl.
*G11B 7/00* (2006.01)
(52) U.S. Cl.
USPC ............. 369/112.01; 369/112.02; 427/58
(58) Field of Classification Search
None
See application file for complete search history.

(56) References Cited

U.S. PATENT DOCUMENTS

| 8,092,711 B2 | 1/2012 | Okada et al. |
| 2009/0280236 A1* | 11/2009 | Hsueh ............... 427/58 |
| 2011/0089372 A1 | 4/2011 | Okada et al. |

OTHER PUBLICATIONS

U.S. Appl. No. 13/344,186, filed Jan. 5, 2012, Satoshi Okada, et al.
U.S. Appl. No. 13/446,117, filed Apr. 13, 2012, Okada, et al.
U.S. Appl. No. 13/708,120, filed Dec. 7, 2012, Shiono, et al.

* cited by examiner

*Primary Examiner* — Muhammad N Edun
(74) *Attorney, Agent, or Firm* — Oblon, Spivak, McClelland, Maier & Neustadt, L.L.P.

(57) ABSTRACT

To provide a polymer compound capable of forming an alignment film which has a sufficient aligning performance to a liquid crystalline compound and which is excellent also in adhesion with an optical anisotropic film obtainable by polymerizing a liquid crystalline compound in an aligned state, and a composition containing it, as well as an alignment film obtainable by using such a composition, an optical element and an optical information writing/reading device. Provided is a polymer compound comprising polymerized units derived from a fumaric acid diester and polymerized units having a radical polymerizable group in a side chain. By using this polymer compound, an alignment film is prepared. An optical element having this alignment film and an optical anisotropic film is used as a retardation plate 4 having mechanical strength and heat resistance, and good reliability without peeling. An optical information writing/reading device is constituted by using it.

12 Claims, 2 Drawing Sheets

R: RIGHT-HANDED CIRCULAR POLARIZATION TRANSMITTANCE (%)

L: LEFT-HANDED CIRCULAR POLARIZATION TRANSMITTANCE (%)

R: RIGHT-HANDED CIRCULAR POLARIZATION TRANSMITTANCE (%)

L: LEFT-HANDED CIRCULAR POLARIZATION TRANSMITTANCE (%)

POLYMER COMPOUND, COMPOSITION FOR ALIGNMENT FILM, ALIGNMENT FILM, OPTICAL ELEMENT, AND OPTICAL INFORMATION WRITING/READING DEVICE

BACKGROUND OF INVENTION

1. Field of Invention

The present invention relates to a polymer compound, a composition for an alignment film, an alignment film, an optical element, and an optical information writing/reading device.

2. Discussion of Background

Various optical recording media such as CD (compact disk), DVD (digital versatile disk) and a high density optical recording disk by blue light (hereinafter referred to as "BD") have been developed, and optical information writing/reading devices to carry out recording of information on and/or reproduction of information from such optical recording media are widely used.

In such an optical information writing/reading device, an optical element such as a retardation plate or a diffractive element for shifting (polarizing, phase-adjusting, etc.) incident light (laser beam) from a light source, is usually used. Further, in an optical information writing/reading device, it is common to use, as a retardation plate, e.g. a quarter wavelength plate to shift linearly polarized light to circularly polarized light or a half wavelength plate to shift linearly polarized light to linearly polarized light having a polarization plane tilted by 90°.

Further, such an optical element for shifting incident light is also incorporated in a liquid crystal display device and is widely used as an absorption type circularly polarizing plate ($\lambda/4$ phase difference layer or $\lambda/2$ phase difference layer) or a linearly polarizing plate to constitute a liquid crystal display device, or a viewing angle compensation layer in various liquid crystal modes.

Here, an optical element such as a retardation plate or a diffractive element is usually prepared by using an optical anisotropic material having a liquid crystal material aligned. The optical anisotropic material is a material having an optical anisotropy such as a refractive index anisotropy derived from a mesogen structure. Further, it is important that an optical element prepared by using such an optical anisotropic material, has a uniform and proper Rd value (represented by $Rd=\Delta n \times d$ where $\Delta n$ is a refractive index anisotropy and d is the thickness in the propagation direction of light).

As a method for producing such an optical anisotropic material, a method is known wherein a polymerizable liquid crystalline compound is polymerized in a state aligned by using an alignment film to obtain a film-form optical anisotropic material wherein such an aligned state is fixed. For example, Patent Documents 1 and 2 disclose that a (meth)acrylate compound having a liquid crystalline structure has a high reactivity, and therefore, when an optical anisotropic material is prepared therefrom by the above method, it is possible to obtain an optical anisotropic material having a uniform Rd value and is excellent also in transparency. Here, in the Patent Documents 1 and 2, a monofunctional (meth)acrylate compound is used.

However, the optical anisotropic film prepared by using such a (meth)acrylate compound having a liquid crystalline structure is not sufficient in the mechanical strength and heat resistance, and various proposals have been made for their improvements. For example, Patent Document 3 discloses a method of carrying out crosslinking by adding a polyfunctional (meth)acrylate having a liquid crystalline structure to the monofunctional (meth)acrylate compound. Further, Patent Documents 4 and 5 disclose a method for producing an optical element by a polymerizable liquid crystal composition composed solely of a polyfunctional acrylate having a liquid crystalline structure. However, there has been a problem that as the content of a polyfunctional (meth)acrylate increases, the adhesive strength with the adjacent alignment film tends to be poor, and peeling is likely to be caused by the inadequate adhesive strength.

Here, as an alignment film to align the liquid crystalline compound, a polyimide film is usually used, since it is excellent in the aligning performance to the liquid crystalline compound and at the same time has sufficient heat resistance and mechanical strength. Further, for the purpose of reducing the thickness of the alignment film, Patent Document 6 discloses an alignment film substrate employing a monomolecular film (LB film) of a fumaric acid diester polymer. Further, for the same purpose, Patent Document 7 discloses a method for subjecting a thin film of a fumaric acid diester polymer to aligning treatment by a rubbing method. However, like the polyimide alignment film, such an alignment film of a fumaric acid diester polymer was poor in the adhesion with a polyfunctional (meth)acrylate compound polymer, although it has the above-mentioned alignment performance, heat resistance and mechanical strength.

Patent Document 1: JP-A-7-17910
Patent Document 2: JP-A-8-3111
Patent Document 3: JP-A-11-80081
Patent Document 4: JP-A-2005-272560
Patent Document 5: JP-A-2008-9284
Patent Document 6: JP-A-02-214731
Patent Document 7: JP-A-03-21919

SUMMARY OF INVENTION

The present invention has been made in view of the above situations, and it is an object of the present invention to provide a novel polymer compound capable of forming an alignment film which has a sufficient aligning performance to a liquid crystalline compound and which is excellent also in adhesion with an optical anisotropic film obtainable by aligning a liquid crystalline compound, particularly an optical anisotropic film containing a polymer of a polymerizable liquid crystalline compound polymerized in an aligned state, and a composition for an alignment film containing it, as well as an alignment film obtainable by using such a composition.

The present invention further has an object to provide an optical element which is obtainable by using such an alignment film and an optical anisotropic film and which has mechanical strength and heat resistance and further has good reliability free from peeling of the alignment film, and a highly reliable optical information writing/reading device employing such an optical element.

The present invention provides a polymer compound having a construction as defined in the following [1] to [8], a composition for an alignment film having a construction as in [9], an alignment film having a construction as in [10], an optical element having a construction as in [11] and [12], and an optical information writing/reading device having a construction as in [13].

[1] A polymer compound comprising polymerized units derived from a fumaric acid diester and polymerized units having a radical polymerizable group in a side chain.

[2] The polymer compound according to [1], which is represented by the following formula (1):

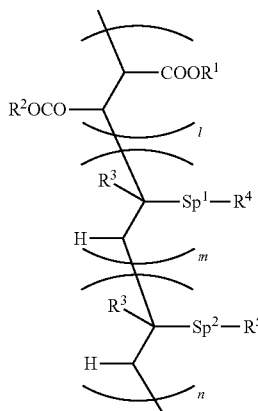

(1)

wherein each of $R^1$ and $R^2$ which are independent of each other, is a $C_{1-12}$ linear, branched or cyclic alkyl group which may have an etheric oxygen atom between carbon-carbon atoms, and of which some or all of the hydrogen atoms may be substituted by fluorine atoms;

$R^3$ is a hydrogen atom, a methyl group or a fluorine atom;

each of $Sp^1$ and $Sp^2$ which are independent of each other, is a single bond or a $C_{1-12}$ hydrocarbon group which may have, between carbon-carbon atoms and at the terminal on the main chain side, an ether bond, a sulfide bond, an ester bond, an amido bond, a thioester bond, a thioamido bond, a dithiocarboxylate ester bond, a carbonate ester bond, a urethane bond, a urea bond, an amino group, —O—CH$_2$—CH(OH)—CH$_2$—OCO— or —COO—CH$_2$—CH(OH)—CH$_2$—O—, and of which some or all of the hydrogen atoms may be substituted by fluorine atoms;

$R^4$ is a monovalent organic group having a radical polymerizable group at its terminal;

$R^5$ is a hydroxy group, an amino group, a mercapto group, a carboxy group or a glycidyloxy group; and l, m and n represent mol %, and l+m+n=100, $30 \leq l \leq 95$, $5 \leq m \leq 70$, and $0 \leq n \leq 30$.

[3] The polymer compound according to [2], wherein in the formula (1), $Sp^1$ is represented by the following formula (2-1), $Sp^2$ is represented by the following formula (2-2), and $R^4$ is a group represented by a formula selected from the group consisting of the following formulae (3-1) to (3-6):

(2-1)

(2-2)

wherein W is a single bond, an ether bond, a sulfide bond, an ester bond, an amido bond, a thioester bond or an amino group;

each of $R^{11}$ and $R^{12}$ which are independent of each other, is a $C_{0-12}$ bivalent hydrocarbon group, of which some or all of the hydrogen atoms may be substituted by fluorine atoms, and which may have, between carbon-carbon atoms and at the terminal on the main chain side, a phenylene group or an etheric oxygen atom;

Z is a single bond, an ether bond, a sulfide bond, an ester bond, an amido bond, a thioester bond, a thioamido bond, a dithiocarboxylate ester bond, a carbonate ester bond, a urethane bond, a urea bond, an amino group, —O—CH$_2$—CH(OH)—CH$_2$—OCO— or —COO—CH$_2$—CH(OH)—CH$_2$—O—, and s is an integer of from 0 to 6, and the sum of values obtained by the number of carbon atoms in $R^{11}$ and multiplying the number of carbon atoms in $R^{12}$ by s is from 0 to 12;

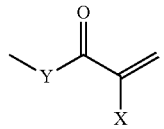

(3-1)

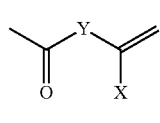

(3-2)

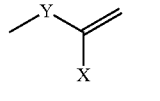

(3-3)

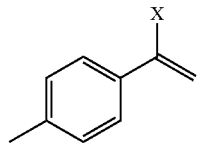

(3-4)

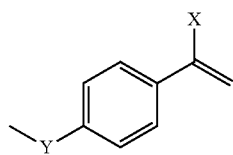

(3-5)

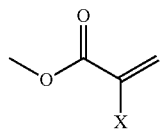

(3-6)

wherein X is a hydrogen atom, a fluorine atom or a methyl group, Y is an oxygen atom, a sulfur atom or an amino group (—NH—), and A is a hydrogen atom, a chlorine atom or a cyano group.

[4] The polymer compound according to [2] or [3], wherein in the formula (1), each of $R^1$ and $R^2$ which are independent of each other, is a $C_{3-12}$ branched or cyclic alkyl group which may have an etheric oxygen atom between carbon-carbon atoms, and of which some or all of the hydrogen atoms may be substituted by fluorine atoms.

[5] The polymer compound according to [3] or [4], wherein W in the formulae (2-1) and (2-2) is a single bond, an ether bond or an ester bond, and Z in the formula (2-1) is a single bond, an ether bond, a sulfide bond, an ester bond, an amido bond, a thioester bond, a carbonate ester bond, a urethane bond, a urea bond, —O—CH$_2$—CH(OH)—CH$_2$—OCO— or —COO—CH$_2$—CH(OH)—CH$_2$—O—.

[6] The polymer compound according to any one of [2] to [5], wherein in the formula (1), $R^4$ is a group represented by the following formula (3-11), (3-21), (3-4), (3-51), (3-52) or (3-61):

(3-11)

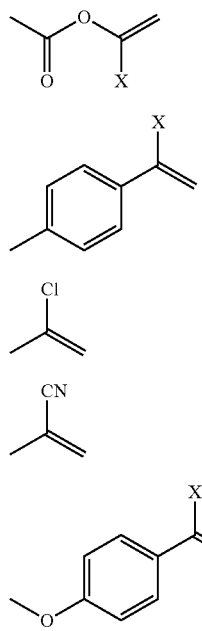

(3-21)

(3-4)

(3-51)

(3-52)

(3-61)

wherein X is a hydrogen atom, a fluorine atom or a methyl group.

[7] The polymer compound according to any one of [2] to [6], wherein in the formula (1), $R^1$ and $R^2$ are the same group.

[8] The polymer compound according to any one of [2] to [7], wherein in the formula (1), $R^4$ is an acryloxy group or a methacryloxy group.

[9] A composition for an alignment film containing the polymer compound as defined in any one of [1] to [8].

[10] An alignment film obtained by subjecting a thin film formed by using the composition for an alignment film as defined in [9] to alignment treatment.

[11] An optical element having the alignment film as defined in [10] and an optical anisotropic film containing a polymer obtainable by polymerizing at least one polymerizable liquid crystalline compound in an aligned state.

[12] The optical element according to [11], wherein the polymer contains polymerized units of a polymerizable liquid crystalline compound having at least two polymerizable groups.

[13] An optical information writing/reading device for recording information on an optical recording medium and/or reading information recorded on an optical recording medium, which has the optical element as defined in [11] or [12].

According to the present invention, it is possible to provide a novel polymer compound capable of forming an alignment film which has a sufficient aligning performance to a liquid crystalline compound and which is excellent also in adhesion with an optical anisotropic film obtainable by aligning a liquid crystalline compound, particularly an optical anisotropic film containing a polymer of a polymerizable liquid crystalline compound polymerized in an aligned state, and a composition for an alignment film containing it, as well as an alignment film obtainable by using such a composition.

Further, according to the present invention, it is possible to provide an optical element which is obtainable by using the above alignment film and the optical anisotropic film and which has mechanical strength and heat resistance and further has good reliability free from peeling of the alignment film, and a highly reliable optical information writing/reading device employing such an optical element.

DETAILED DESCRIPTION OF PREFERRED EMBODIMENTS

Figure 1:
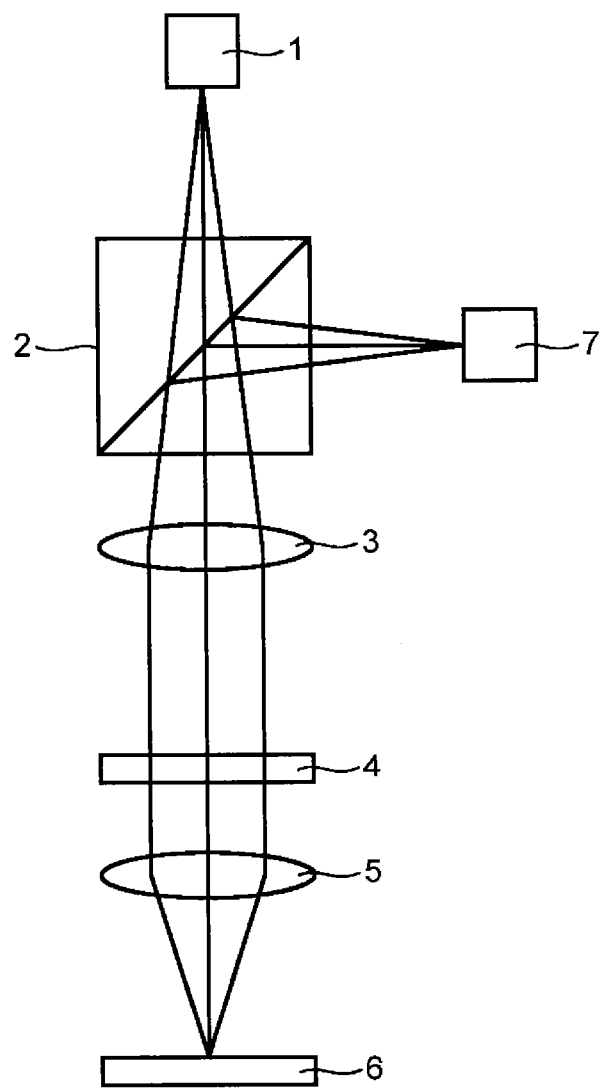
FIG. 1 is a construction view schematically illustrating an embodiment of the optical information writing/reading device of the present invention.

Now, the present invention will be described in detail with reference to preferred embodiments. The terms used in the description in this specification should be interpreted as follows. Further, a compound represented by a formula may be represented as a compound identified by the number of the formula, i.e. a polymer compound represented by the formula (1) may be represented as a polymer compound (1).

The "liquid crystalline compound" means "a compound capable of exhibiting a liquid crystal phase by itself or a compound which can be used as a component of a liquid crystal composition when mixed with another liquid crystal compound, even if it does not have a liquid crystal phase by itself", and the "polymerizable liquid crystal compound" means a compound having polymerizability and capable of exhibiting a liquid crystal phase by itself, or a compound having polymerizability which can be used as a component of a liquid crystal composition when mixed with another liquid crystal compound even if it does not have a liquid crystal phase by itself". Further, the "liquid crystalline composition" means "a composition containing one or more liquid crystalline compounds, wherein each of such crystalline compounds is capable of exhibiting a liquid crystal phase by itself, or a reaction product obtained by a reaction of various components contained in the composition containing such liquid crystalline compounds, can exhibit a liquid crystal phase". The mesogen is a rigid molecular chain portion like a rod-form or plate-form molecular chain (including alicyclic and aromatic rings).

"Δn" is an abbreviated symbol for "refractive index anisotropy". Here, a value of wavelength in the following description may include a range of the disclosed value±2 nm.

The expression "(meth)acryl . . . " is used as a general expression meaning both of "acryl . . . " and "methacryl . . . ". For example, "(meth)acryloxy group" means both of "acryloxy group" and "methacryloxy group". Further, in a chemical formula, —COO— represents —C(=O)O—, and —OCO— represents —OC(=O)—.

[Polymer Compound]

The polymer compound of the present invention is a polymer compound comprising polymerized units derived from a fumaric acid diester and polymerized units having a radical polymerizable group in a side chain. When an alignment film is prepared by using such a polymer compound, it is possible to obtain an alignment film excellent in the aligning performance to a liquid crystalline compound mainly by the effect of polymerized units derived from the fumaric acid diester. Further, the polymer compound is excellent in adhesion to a polymer (optical anisotropic material) obtainable by polymerizing a polymerizable liquid crystalline compound in an aligned state, particularly to an optical anisotropic material obtainable from a liquid crystalline composition containing a polyfunctional polymerizable liquid crystalline compound, since it has a radical polymerizable group in a side chain.

As such a polymer compound of the present invention, a polymer compound represented by the following formula (1) may specifically be mentioned.

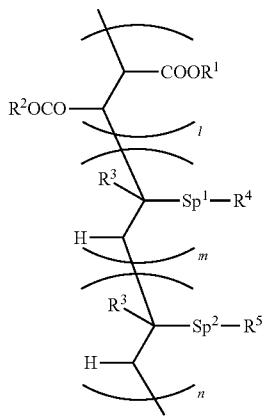

(1)

wherein each of $R^1$ and $R^2$ which are independent of each other, is a $C_{1-12}$ linear, branched or cyclic alkyl group which may have an etheric oxygen atom between carbon-carbon atoms, and of which some or all of the hydrogen atoms may be substituted by fluorine atoms;

$R^3$ is a hydrogen atom, a methyl group or a fluorine atom;

each of $Sp^1$ and $Sp^2$ which are independent of each other, is a single bond or a $C_{1-12}$ hydrocarbon group which may have, between carbon-carbon atoms and at the terminal on the main chain side, an ether bond, a sulfide bond, an ester bond, an amido bond, a thioester bond, a thioamido bond, a dithiocarboxylate ester bond, a carbonate ester bond, a urethane bond, a urea bond, an amino group, $-O-CH_2-CH(OH)-CH_2-OCO-$ or $-COO-CH_2-CH(OH)-CH_2-O-$, and of which some or all of the hydrogen atoms may be substituted by fluorine atoms;

$R^4$ is a monovalent organic group having a radical polymerizable group at its terminal;

$R^5$ is a hydroxy group, an amino group, a mercapto group, a carboxy group or a glycidyloxy group; and l, m and n represent mol %, and l+m+n=100, $30 \leq l \leq 95$, $5 \leq m \leq 70$, and $0 \leq n \leq 30$.

The polymer compound represented by the above formula (1) is a copolymer constituted by polymerized units derived from a fumaric acid diester (hereinafter referred to as polymerized units (a1)), polymerized units having a radical polymerizable group in a side chain (hereinafter referred to as polymerized units (a2)) and polymerized units having the above specified functional group in a side chain (hereinafter referred to as polymerized units (a3)), and it is a copolymer wherein when all constituting units to constitute the copolymer are represented by 100 mol %, mol % of the respective polymerized units is represented by 1 mol % with respect to polymerized units (a1), m mol % with respect to polymerized units (a2) and n mol % with respect to polymerized units (a3).

In the polymer compound (1), the proportion of polymerized units (a1) i.e. the range of 1 mol % is $30 \leq l \leq 95$, the proportion of polymerized units (a2) i.e. the range of m mol % is $5 \leq m \leq 70$, and the proportion of polymerized units (a3) i.e. the range of n mol % is $0 \leq n \leq 30$.

If the proportion l of polymerized units (a1) i.e. polymerized units derived from fumaric acid diester, is less than 30 mol %, the alignment film obtainable by using the polymer compound (1) may not be able to sufficiently align a liquid crystalline compound. On the other hand, if the proportion m of polymerized units (a2) i.e. polymerized units having a radial polymerizable group in a side chain, is less than 5 mol %, adequate adhesion may not be obtainable between the alignment film obtainable by using the polymer compound (1) and an optical anisotropic material having a liquid crystalline compound aligned, particularly an optical anisotropic material containing polymerized units having a polyfunctional polymerizable liquid crystalline compound polymerized in an aligned state. From the balance between the aligning characteristics and the adhesion, the proportions (mol %) of such respective polymerized units in the polymer compound (1), are particularly preferably $50 \leq l \leq 80$ and $20 \leq m \leq 50$ (mol %).

Here, in the polymer compound (1), polymerized units (a3) are optional polymerized units, as described above. The polymer compound (1) is preferably constituted solely by polymerized units (a1) and polymerized units (a2) in a case where it is used as an alignment film for an optical element. In such a case, the polymer compound (1) may contain optional polymerized units such as polymerized units (a3) within a range not to impair the effects, specifically within a range not to exceed 30 mol %, as shown above. Polymerized units (a3) are, for example, polymerized units to be used for introducing a radical polymerizable group to a side chain at the time of producing the polymer compound (1) and polymerized units which may remain within the above range in the polymer compound (1) finally obtainable.

$R^1$ and $R^2$ in polymerized units (a1) in the polymer compound (1) represent alcohol residues of an esterification reaction with fumaric acid in a fumaric acid diester as a monomer. Each of $R^1$ and $R^2$ which are independent of each other, is a $C_{1-12}$ linear, branched or cyclic alkyl group, which may have an etheric oxygen atom between carbon-carbon atoms, and of which some or all of the hydrogen atoms may be substituted by fluorine atoms. From the viewpoint of preparation of a high molecular weight product, each of $R^1$ and $R^2$ is preferably a $C_{3-12}$ unsubstituted branched alkyl or cyclic alkyl group. Such an alkyl group may specifically be e.g. an isopropyl group, a sec-butyl group, a tert-butyl group, a sec-pentyl group, a tert-pentyl group, a sec-hexyl group, a tert-hexyl group, a cyclopropyl group, a cyclopentyl group or a cyclohexyl group. Particularly preferred is an isopropyl group, whereby the alignment characteristics will be excellent. Further, from the viewpoint of the alignment characteristics, it is preferred that $R^1$ an $R^2$ are the same group.

In polymerized units (a2) and polymerized units (a3) in the polymer compound (1), $R^3$ is a hydrogen atom, a methyl group or a fluorine atom. Further, $Sp^1$ in polymerized units (a2) is a group or a single bond which links $R^4$ representing a monovalent organic group having a radical polymerizable group at its terminal, to the main chain carbon. Likewise, $Sp^2$ in polymerized units (a3) is a group or a single bond which links $R^5$ representing a hydroxy group, an amino group, a mercapto group, a carboxy group or a glycidyloxy group, to the main chain carbon.

Specifically, each of $Sp^1$ and $Sp^2$ which are independent of each other, is a single bond or a $C_{1-12}$ hydrocarbon group which may have, between carbon-carbon atoms and at the terminal on the main chain side, an ether bond, a sulfide bond, an ester bond, an amido bond, a thioester bond, a thioamido bond, a dithiocarboxylate ester bond, a carbonate ester bond, a urethane bond, a urea bond, an amino group, $-O-CH_2-$ CH(OH)—CH$_2$—OCO— or —COO—CH$_2$—CH(OH)—CH$_2$—O—, and of which some or all of the hydrogen atoms may be substituted by fluorine atoms. Here, among the above respective bonds, with respect to one which is not bilaterally symmetric, the direction of such a bond is not limited. For example, in the case of an ester bond, either —OCO— or —COO— is applicable.

Specifically, as such Sp$^1$, a group represented by the following formula (2-1) is preferably used, and specifically as Sp$^2$, a group represented by the following formula (2-2) is preferably used.

  (2-1)

  (2-2)

In the formulae (2-1) and (2-2), W shown at the left-hand side is bonded to the main chain carbon. In the formula (2-1), [Z—R$^{12}$]$_s$ shown at the right-hand side is bonded to a monovalent organic group (R$^4$) having a radical polymerizable group at its terminal, and in the formula (2-2), R$^{11}$ shown at the right-hand side is bonded to any one of the above functional groups (R$^5$).

Further, in the formulae (2-1) and (2-2), W is a single bond, an ether bond (—O—), a sulfide bond (—S—), an ester bond (COO— or —OCO—), an amido bond (—NH—CO— or —CO—NH—), a thioester bond (—CO—S— or —S—CO—) or an amino group (—NH—). Among them, a single bond, an ether bond and an ester bond are preferred as W from the viewpoint of preparation of the polymer compound in the present invention.

R$^{11}$ is a C$_{0-12}$ bivalent hydrocarbon group, of which some or all of the hydrogen atoms may be substituted by fluorine atoms, and which may have, between carbon-carbon atoms and at the terminal on the main chain side, a phenylene group or an etheric oxygen atom. R$^{11}$ is preferably an unsubstituted bivalent hydrocarbon group (—(CH$_2$)$_t$- which may have a phenylene group, wherein t is an integer of from 0 to 12), more preferably a 1,4-phenylene group (hereinafter referred to as "Ph"), a group having Ph bonded to the W side and further having an unsubstituted C$_{1-6}$ bivalent hydrocarbon group bonded to Ph, or a C$_{0-6}$ unsubstituted linear alkylene group (which may have an ether oxygen atom between carbon-carbon atoms in a case where the number of carbon atoms is 2 or more). Particularly preferred are Ph and an unsubstituted C$_{0-4}$ linear alkylene group.

Z is a single bond, an ether bond (—O—), a sulfide bond (—S—), an ester bond (—COO— or —OC—), an amido bond (—NH—CO— or —CO—NH—), a thioester bond (—CO—S— or —S—CO—), a thioamido bond (—NH—CS— or —CS—NH—), a dithiocarboxylate ester bond (—CS—S— or —S—CS—), a carbonate ester bond (—O—CO—O—), a urethane bond (—NH—COO— or —OCO—NH—), a urea bond (—NH—CO—NH—), an amino group (—NH—), —O—CH$_2$—CH(OH)—CH$_2$—OCO— or —COO—CH$_2$—CH(OH)—CH$_2$—O—. Among them, from the viewpoint of the preparation of the polymer compound in the present invention, Z is preferably a single bond, an ether bond, a sulfide bond, an ester bond, an amido bond, a thioester bond, a carbonate ester bond, a urethane bond, a urea bond, —O—CH$_2$—CH(OH)—CH$_2$—OCO— or —COO—CH$_2$—CH(OH)—CH$_2$—O—.

R$^{12}$ is a C$_{0-12}$ bivalent hydrocarbon group, of which some or all of the hydrogen atoms may be substituted by fluorine atoms, and which may have a phenylene group between carbon-carbon atoms and at its terminal. R$^{12}$ is preferably an unsubstituted bivalent hydrocarbon group (—(CH$_2$)$_u$— which may contain a phenylene group, wherein u is an integer of from 0 to 12), more preferably a C$_{0-6}$ unsubstituted linear alkylene group. Particularly preferred is an unsubstituted C$_{0-4}$ linear alkylene group. s representing the number of repetitions of [Z—R$^{12}$] is an integer of from 0 to 6. The value of s is preferably from 0 to 4, more preferably from 0 to 2.

Further, in the formula (2-1), the sum of values obtained by the number of carbon atoms in R$^{11}$ and multiplying the number of carbon atoms in R$^{12}$ by s is from 0 to 12. The sum of such values is preferably from 0 to 6 from the viewpoint of the aligning performance of an alignment film obtainable by using the polymer compound (1) to align a liquid crystalline compound horizontally.

In the polymer compound (1), each of Sp$^1$ and Sp$^2$ which are independent of each other, is more preferably a group represented by the following formula (Sp-1) or (Sp-2). Further, as Sp$^1$, also a group represented by the following formula (Sp-3) may be mentioned as a preferred group.

  (Sp-1)

  (Sp-2)

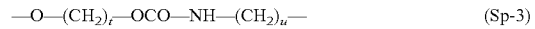  (Sp-3)

In the above formulae, each of t and u which are independent of each other, is an integer of from 0 to 12, provided that t+u is from 0 to 12. Preferably, each of t and u is from 0 to 4, provided that t+u is from 0 to 6.

Among them, particularly preferred as Sp$^1$ or Sp$^2$ in the above formula (1) may, for example, be —O—(CH$_2$)$_2$— or —COO—(CH$_2$)$_2$—. As Sp$^1$, —O—(CH$_2$)$_2$—OCO—NH—(CH$_2$)$_2$— may, for example, be also preferred.

In polymerized units (a2) in the polymer compound (1), R$^4$ constituting the terminal of a side chain, as linked to the above Sp$^1$, is not particularly limited so long as it is a monovalent organic group having a radical polymerizable group at its terminal. Specifically, the radical polymerizable group may, for example, be a vinyl group which may be substituted. In R$^4$, a structure to link the terminal radical polymerizable group to Sp may, for example, be a single bond, an ether bond (—O—), a sulfide bond (—S—), an amino group (—NH—), an ester bond (—COO— or —OCO—), a thioester bond (—CO—S— or —S—CO—), a substituted or unsubstituted amido bond (—NH—CO— or —CO—NH—) or a 1,4-phenylene group.

Such R$^4$ is preferably a monovalent organic group represented by a formula selected from the following formulae (3-1) to (3-6):

  (3-1)

  (3-2)

  (3-3)

-continued

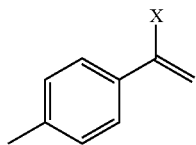
(3-4)

(3-5)

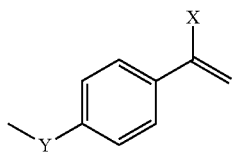
(3-6)

wherein X is a hydrogen atom, a fluorine atom or a methyl group, Y is an oxygen atom, a sulfur atom or an amino group (—NH—), and A is a hydrogen atom, a chlorine atom or a cyano group.

Among them, $R^4$ is more preferably a monovalent organic group having a radical polymerizable group at its terminal represented by the following formula (3-11), (3-21), (3-4), (3-51), (3-52) or (3-61):

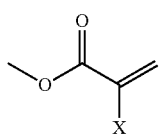
(3-11)

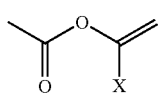
(3-21)

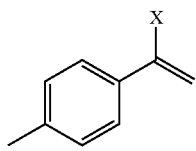
(3-4)

(3-51)

(3-52)

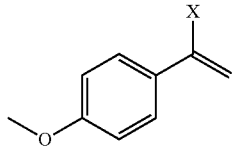
(3-61)

wherein X is as defined above.

Further, among them, $R^4$ in the above formula (1) is particularly preferably a (meth)acryloxy group which is a group represented by the above formula (3-11) wherein X is a hydrogen atom or a methyl group. When $R^4$ is such a (meth)acryloxy group, the excellent effects for adhesion between an alignment film obtainable by using the polymer compound (1) and an optical anisotropic material having a liquid crystalline compound aligned, particularly an optical anisotropic material containing, as polymerized units, a polyfunctional polymerizable liquid crystalline compound polymerized in an aligned state, will be distinct.

In polymerized units (a3) in the polymer compound (1), $R^5$ constituting the terminal of a side chain, as linked to the above $Sp^2$, is a hydroxy group, an amino group, a mercapto group, a carboxy group or a glycidyloxy group. Among them, $R^5$ is preferably a hydroxy group or a carboxy group. Further, usually, polymerized units (a2) have such a structure that to $R^5$ in polymerized units (a3), a compound having both a functional group reactive therewith and the above $R^4$ is reacted and bonded. Accordingly, Z in $Sp^1$ in polymerized units (a2) has a structure containing a residual group of $R^5$, in a case where $Sp^1$ is other than a single bond.

The polymer compound (1) of the present invention is not particularly limited so long as it has a composition wherein polymerized units (a1) derived from a fumaric acid diester, polymerized units (a2) derived from a monomer having a radical polymerizable group in a side chain and polymerized units (a3) having the above specified functional group in a side chain, are contained in the above-mentioned ratio of l:m:n by mol %. Further, the polymer compound (1) may be any of a random copolymer, an alternate copolymer, a block copolymer, a graft copolymer, etc. Its production method will be described below.

Further, as the polymer compound (1), a polymer having a structure wherein polymerized units (a1) are consecutively arranged, is preferred, since it is thereby easy to control the alignment and the solubility in a coating solvent and in a liquid crystal composition. And, a polymer compound (1) containing a homopolymer of polymerized units (a1) is also preferred. As a method for obtaining a polymer compound (1) having a structure wherein polymerized units (a1) are consecutively arranged, a method may, for example, be mentioned wherein a reaction to polymerize a monomer to constitute polymerized units (a1) is preliminarily carried out, and then adding a monomer to constitute polymerized units (a2) and a monomer to constitute polymerized units (a3) during the polymerization reaction.

The molecular weight of the polymer compound (1) is preferably from 1,000 to 1,000,000 as a number average molecular weight (Mn). From the viewpoint of the above-mentioned aligning characteristics, when an alignment film is prepared by using it, the number average molecular weight is more preferably from 5,000 to 1,000,000, and further, with a view to preparing such an alignment film in the form of a thin film, the number average molecular weight is particularly preferably from 5,000 to 300,000. Here, in this specification, the number average molecular weight (Mn) is one measured by a gel permeation chromatography (GPC) method using polystyrene as the standard.

<Preparation of Polymer Compound (1)>

A preparation method for the polymer compound (1) of the present invention will be specifically described with reference to the case of a polymer compound represented by the following formula (1A), wherein $R^4$ is a (meth)acryloxy group. However, the polymer compound (1) may be prepared by methods other than the following method.

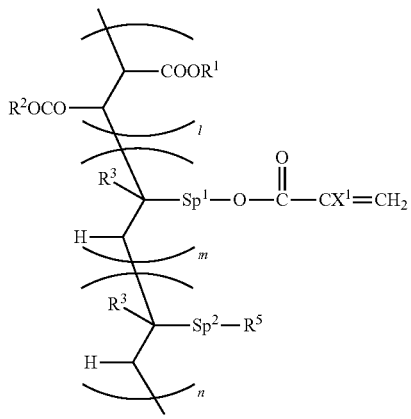

(1A)

Here, in the above compound (1A), $R^1$, $R^2$, $R^3$, $R^5$, $Sp^1$, $Sp^2$, l, m and n are the same as the respective symbols in the formula (1), and $X^1$ is a hydrogen atom or a methyl group.

The preparation method for the compound (1A) may suitably be selected depending upon the structures of $Sp^1$ and $Sp^2$-$R^5$ in the formula (1A). Hereinafter, preparation methods for the compound (1A) corresponding to several structures wherein $Sp^1$ and $Sp^2$ are represented by the above-mentioned formulae (2-1) and (2-2), respectively, will be described.

Firstly, with respect to a case where in $Sp^1$, s in $[Z—R^{12}]_s$ is 0, i.e. $Sp^1=Sp^2=-W-R^{11}-$, and $R^5$ is a hydroxy group, a preparation method represented by the following formula may, for example, be mentioned.

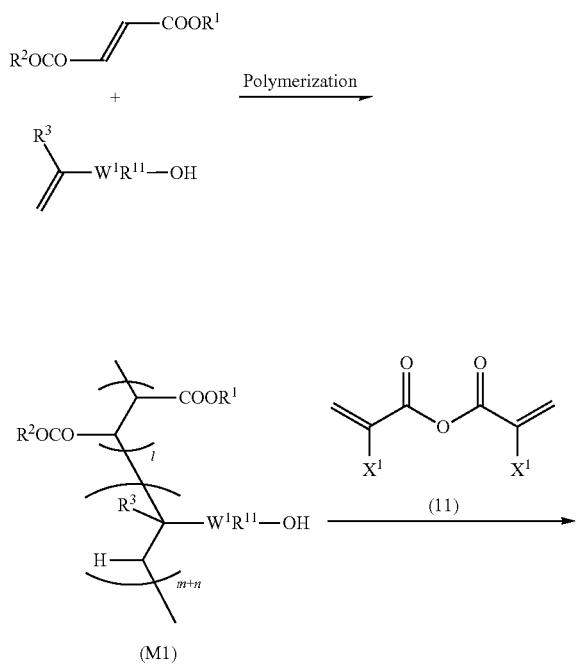

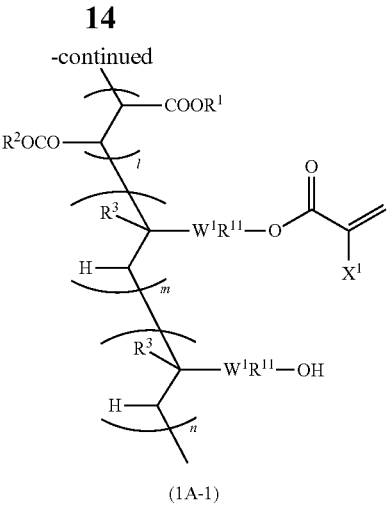

(1A-1)

As shown by the above formula, firstly, a fumaric acid diester as a monomer to constitute polymerized units (a1), and a vinyl monomer having a —$W^1$—$R^{11}$—OH group in a side chain as a monomer to constitute polymerized units (a2) and polymerized units (a3) are polymerized in a ratio of l:m+n by mol %, to obtain a polymer compound (M1). Here, during a preceding polymerization reaction of a fumaric acid diester, a vinyl compound having a —$W^1$—$R^{11}$—OH group in a side chain may be subsequently added to obtain a polymer compound (M1) containing a homopolymer of the fumaric acid diester.

The polymerization is carried out by a radical polymerization method. As the radical polymerization method, a conventional radical polymerization method, for example, any one of a bulk polymerization method, a solution polymerization method, a suspension polymerization method, a precipitation polymerization method and an emulsion polymerization method may be employed. Further, the molecular weight in the finally obtainable polymer compound is adjusted by the polymerization degree of the radical polymerization hereby carried out.

The polymerization initiator at the time of carrying out the radical polymerization method may, for example, be an organic peroxide such as benzoyl peroxide, lauryl peroxide, octanoyl peroxide, acetyl peroxide, di-t-butyl peroxide, t-butylcumyl peroxide, dicumyl peroxide, t-butyl peroxyacetate, or t-butyl peroxybenzoate; or an azo type initiator such as 2,2'-azobis(2,4-dimethylvaleronitrile), 2,2'-azobis(2-butyronitrile), 2,2'-azobisisobutyronitrile, dimethyl-2,2'-azobisisobutyrate, 1,1'-azobis(cyclohexane-1-carbonitrile).

Further, in the case of carrying out a solution polymerization method or a precipitation polymerization method, the solvent to be used is not particularly limited, and it may, for example, be an aromatic solvent such as benzene, toluene or xylene; an alcohol type solvent such as methanol, ethanol, propyl alcohol or butyl alcohol; cyclohexane, dioxane, tetrahydrofuran, acetone, methyl ethyl ketone, dimethyl formamide, or isopropyl acetate. A mixed solvent thereof may also be used.

Further, the polymerization temperature at the time of carrying out the radical polymerization may suitably be set depending upon the decomposition temperature of the polymerization initiator, and it is preferably within a range of from 40 to 150° C.

Then, to the polymer compound (M1) obtained as described above, (meth)acrylic acid anhydride represented by the formula (11) to convert m mol % of polymerized units having the —$W^1$—$R^{11}$—OH group in a side chain in the polymer compound (M1) to polymerized units (a2) having a (meth)acryloxy group at a terminal thereby to obtain a polymer compound (1A-1) in the above reaction formulae. Here, in the polymer compound (M1), polymerized units (n mol %) not subjected to the above reaction among polymerized units having the —$W^1$—$R^{11}$—OH group in a side chain become polymerized units (a3) in the polymer compound (1A-1).

Further, in a case where the functional group $R^5$ which $Sp^2$ has, is a hydroxy group, and in $Sp^1$, s in $[Z—R^{12}]_s$ is 1, and Z is a urethane bond obtainable by a reaction with the hydroxy group as $R^5$, a preparation method represented by the following reaction formula may, for example, be mentioned.

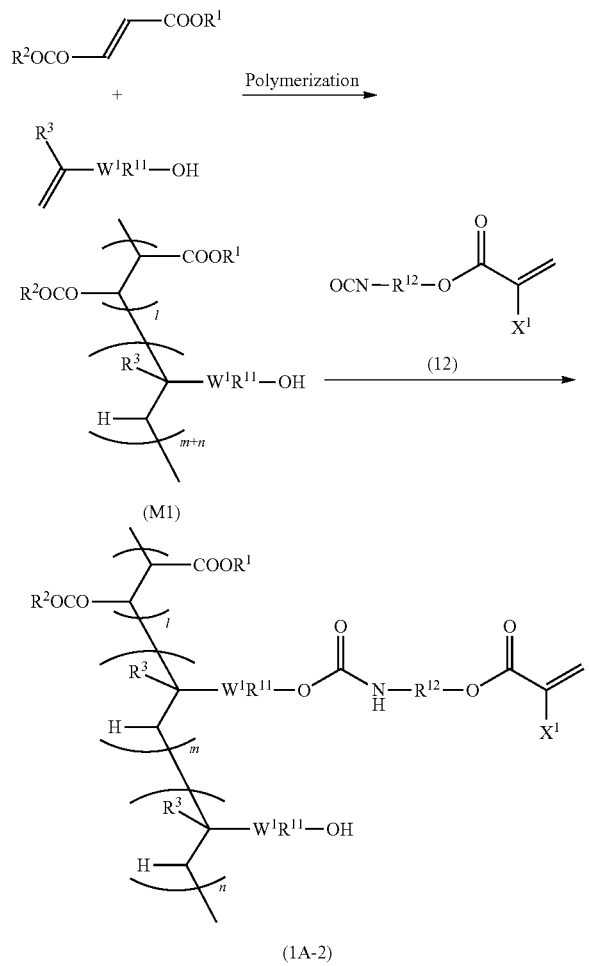

(1A-2)

In the above reaction formula, the step of obtaining a polymer compound (M1) by polymerizing a fumaric acid diester as a monomer to constitute polymerized units (a1), and a vinyl compound having a —$W^1$—$R^{11}$—OH group in a side chain as a monomer to constitute polymerized units (a2) and polymerized units (a3) in a ratio of l:m+n by mol %, can be carried out in the same manner as described above.

Then, to the polymer compound (M1) thus obtained, a (meth)acrylate having an isocyanate group represented by the formula (12) is reacted to obtain a polymer compound (1A-2) in the above reaction formulae. By this reaction, m mol % of polymerized units having the —$W^1$—$R^{11}$—OH group in a side chain in the polymer compound (M1) form urethane bonding with the (meth)acrylate having an isocyanate group and are converted to polymerized units (a2) having a (meth)acryloxy group at the terminal in the side chain. Further, in the polymer compound (M1), polymerized units (n mol %) not subjected to the above reaction among polymerized units having the —$W^1$—$R^{11}$—OH group in a side chain become polymerized units (a3) in the polymer compound (1A-2).

Further, by changing the isocyanate group in the compound (12) to another functional group reactive with a hydroxy group, e.g., a carboxy group, a reaction may be carried out under known reaction conditions to prepare a polymer compound having an ester bond as Z.

Further, in a case where the functional group $R^5$ which $Sp^2$ has, is a carboxy group, and in $Sp^1$, s in $[Z—R^{12}]_s$ is 1, and Z is a group represented by —COO—$CH_2$—CH(OH)—$CH_2$—O— obtainable by a reaction with the carboxy group as $R^5$, a preparation method represented by the following reaction formula may, for example, be mentioned.

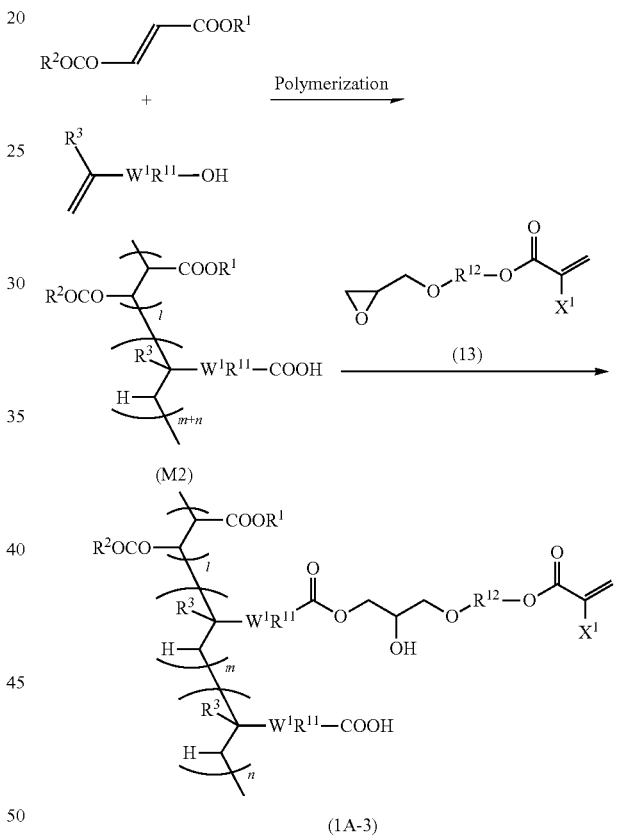

(1A-3)

As shown in the above reaction formula, firstly, a fumaric acid diester as a monomer to constitute polymerized units (a1) and a vinyl monomer having a —$W^1$—$R^{11}$—COOH group in a side chain as a monomer to constitute polymerized units (a2) and polymerized units (a3), are polymerized in a ratio of l:m+n by mol %, to obtain a polymer compound (M2). The polymerization is carried out by a radical polymerization method. The method for radical polymerization is the same as in the above-described case of obtaining the polymer compound (M1).

Then, to the polymer compound (M2) thus obtained, a (meth)acrylate having a glycidyloxy group represented by the formula (13) is reacted to obtain a polymer compound (1A-3) in the above reaction formulae. By this reaction, m mol % of polymerized units having the —$W^1$—$R^{11}$—COOH group in a side chain in the polymer compound (M2) form ester bonding with the (meth)acrylate having a glycidyloxy group and are converted to polymerized units (a2) having a (meth)acryloxy group at the terminal of a side chain. Further, in the polymer compound (M2), polymerized units (n mol) not subjected to the above reaction among polymerized units having the —$W^1$—$R^{11}$—COOH group in a side chain, become polymerized units (a3) in the polymer compound (1A-3).

Further, by changing the glycidyloxy group in the compound (13) to another functional group reactive with a carboxy group, e.g. a hydroxy group or an amino group, a reaction may be carried out under respectively known reaction conditions to prepare a polymer compound having an ester bond or an amido bond as Z.

Further, as shown in the following reaction formula, by using a method wherein a fumaric acid diester and a vinyl compound having a 3-bromopropionic acid ester or 3-bromo-2-methylpropionic acid ester structure at its terminal and having $Sp^1$ represented by the above-mentioned formula (2-1) as a linking group, are polymerized, followed by acrylation treatment by removal of HBr, it is possible to prepare a polymer compound (1A) by a similar method without depending upon the type of the linking group $Sp^1$.

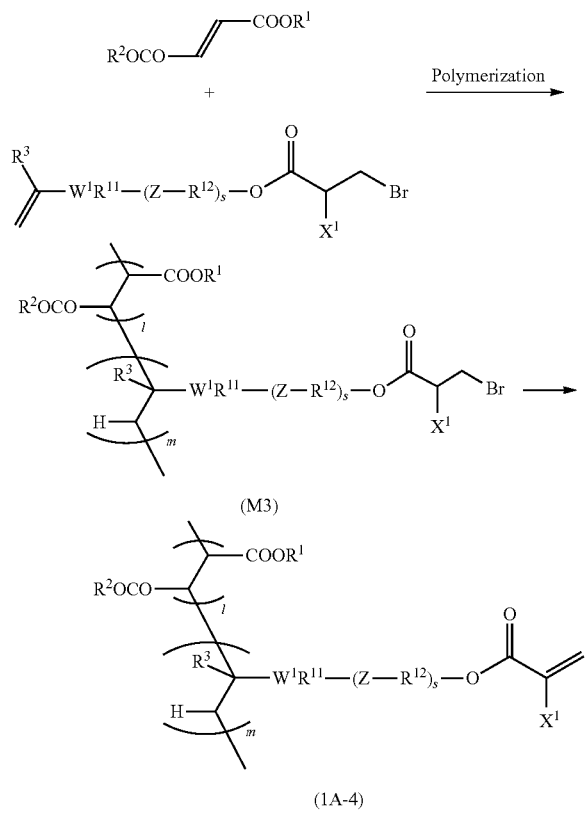

(1A-4)

In this method, as shown in the above reaction formula, firstly, a fumaric acid diester as a monomer to constitute polymerized units (a1) and a vinyl compound having a 3-bromopropionic acid ester or 3-bromo-2-methylpropionic acid ester structure at a terminal as a monomer to constitute polymerized units (a2) and having $Sp^1$ represented by the above-mentioned formula (2-1) as a linking group, are polymerized in a ratio of l:m by mol %, to obtain a polymer compound (M3). The polymerization is carried out by a radical polymerization method. The method for radical polymerization may be the same as in the above-described case of obtaining the polymer compound (M1).

Then, this polymer compound (M3) is subjected to acrylation treatment by removal of HBr to obtain a polymer compound (1A-4). Here, the polymer compound (1A-4) obtainable by this method is a copolymer constituted solely by polymerized units derived from a fumaric acid diester i.e. polymerized units (a1) and polymerized units having a radical polymerizable group in a side chain i.e. polymerized units (a2) and not having polymerized units having the above-specified functional group in a side chain i.e. polymerized units (a3).

Further, in the above respective reaction formulae, mol % of polymerized units derived from a fumaric acid diester i.e. polymerized units (a1), represented by l, may increase or decrease between starting materials such as polymer compounds (M1) and (M2), and polymer compounds (1A-1) to (1A-3) as reaction products. This is an increase or decrease attributable to such facts that in the reaction process, a homopolymer of the fumaric acid diester may be prepared, and in the purification step, the solubility is different between such a homopolymer and the polymer compound (1).

The polymer compound of the present invention may be formed into a thin film which may be used as an alignment film to align a liquid crystalline compound to form an optical anisotropic material. Further, it is preferably used as an alignment film to polymerize a polymerizable liquid crystalline compound in an aligned state to obtain a polymer (optical anisotropic material), particularly as an alignment film to obtain a polymer (optical anisotropic material) from a polymerizable liquid crystalline composition containing a polyfunctional polymerizable liquid crystalline compound.

[Composition for Alignment Film, and Alignment Film]

In order to prepare an alignment film by using the above polymer compound of the present invention, firstly, a composition for an alignment film containing the above polymer compound of the present invention, is prepared.

The composition for an alignment film contains the polymer compound of the present invention, preferably the polymer compound (1), as an essential component, and usually further contains an organic solvent to sufficiently dissolve the polymer compound to make it possible to form an alignment film. The organic solvent is not particularly limited so long as it is an organic solvent capable of dissolving the polymer compound of the present invention. Specifically, an organic solvent such as benzene, toluene or xylene; an alcohol type solvent such as methanol, ethanol, propyl alcohol or butyl alcohol; cyclohexane, dioxane, tetrahydrofuran, acetone, methyl ethyl ketone, dimethylformamide or isopropyl acetate may, for example, be mentioned. A mixed solvent thereof may preferably be mentioned. Further, various additives may be used as the case requires. The blend ratio of the polymer compound of the present invention to the organic solvent in the composition for an alignment film is suitably selected depending upon the method for forming an alignment film.

For the preparation of an alignment film by using the composition for an alignment film, it is possible to apply a method for preparing an alignment film on a substrate which is commonly used at the time of preparing an alignment film for aligning a liquid crystalline compound to obtain an optical anisotropic material. The substrate is used, together with the alignment film formed thereon, to align a liquid crystalline compound, but in many cases, also thereafter, it will be used as it is, as an element to constitute an optical element. Accordingly, it is preferred to use a substrate suitable as an element to constitute an optical element.

As such a substrate, a transparent substrate is preferred. The transparent substrate is preferably a substrate made of a material having a high transmittance to visible light. Specifically, in addition to an inorganic glass such as alkali glass, alkali-free glass or quartz glass, a substrate made of a transparent resin such as a polyester, a polycarbonate, a polyether, a polysulfone, a polyethersulfone, a polyvinyl alcohol or a fluoropolymer such as a polyvinyl fluoride, may be mentioned. From the viewpoint of high rigidity, it is preferred to employ a substrate made of an inorganic glass. The thickness of the transparent substrate is not particularly limited, but it is usually from 0.2 mm to 1.5 mm, preferably from 0.3 mm to 1.1 mm. On such a transparent substrate, a surface treatment layer made of e.g. an inorganic or organic substance may be provided for the purpose of prevention of alkali elution, improvement of the adhesion, antireflection or hard coating, as the case requires. In such a case, the alignment film of the present invention is prepared on such a surface treatment layer.

Then, the composition for an alignment film containing the polymer compound of the present invention obtained by the above-described method is applied on the surface of the transparent substrate by a method such as a spin coating method, a Langmuir-Blodgett method or a printing method, and the solvent is removed by e.g. drying to form a thin film. The film thickness is preferably from 1 to 100 nm with a view to controlling alignment of the liquid crystalline compound. The film thickness is further preferably from 10 to 100 nm, particularly preferably from 10 to 50 nm.

The thin film thus obtained is subjected to alignment treatment to obtain an aligned film. As the alignment treatment, the same method as alignment treatment which is carried out for a conventional alignment film, such as a polyimide film or a fumaric acid diester polymer thin film, may be used without any particular restriction. As such alignment treatment, a treatment method may, for example, be mentioned wherein the surface of an alignment film is rubbed in one direction with a rubbing cloth made of e.g. nylon or rayon to align the liquid crystalline compound in that direction. The rubbing condition is not particularly limited, but rubbing treatment by a torque of from 1 to 10 kgf/cm² may, for example, be mentioned.

Here, after aligning the liquid crystalline compound to obtain an optical anisotropic material, the alignment film may be separated from such an optical anisotropic material. In such a case, release-treatment may be applied to the surface of the alignment film, as the case requires. As such release treatment, a method may, for example, be mentioned wherein the surface of the alignment film is treated with a release agent such as a fluorosilane type release agent or a fluoropolymer having a fluorinated alicyclic structure.

[Optical Element]

The optical element of the present invention has the alignment film obtained as described above and an optical anisotropic film containing a polymer obtainable by polymerizing at least one polymerizable liquid crystalline compound in an aligned state.

Such an optical anisotropic film is formed by using a polymerizable liquid crystalline composition containing a polymerizable liquid crystalline compound by utilizing the effect of the above alignment film.

<Polymerizable Liquid Crystalline Composition>

The polymerizable liquid crystalline composition to be used for the preparation of the optical element of the present invention contains at least one polymerizable liquid crystalline compound.

As such a polymerizable liquid crystalline compound, specifically, a monofunctional polymerizable liquid crystalline compound having a mesogen structure and having one group having a radical polymerizable group, e.g. the same group as the group represented by $R^4$ in the above polymer compound (1), or a bifunctional polymerizable liquid crystalline compound likewise having a mesogen structure and having two groups having a radical polymerizable group may, for example, be used. One of them may be used alone, or two or more of them may be used in combination. In the present invention, it is preferred to use a polymerizable liquid crystalline composition containing a bifunctional polymerizable liquid crystalline compound, whereby the excellent effect in adhesion between the obtainable optical anisotropic film and the above alignment film is more distinct.

The polymerizable liquid crystalline compound to be used in the present invention may, for example, be a monofunctional compound (2A) having one (meth)acryloxy group or a bifunctional compound (2B) having two (meth)acryloxy groups as shown below.

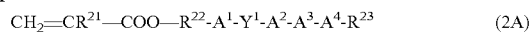

$$CH_2=CR^{21}-COO-R^{22}-A^1-Y^1-A^2-A^3-A^4-R^{23} \quad (2A)$$

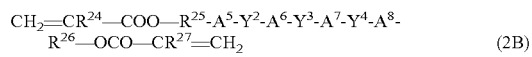

$$CH_2=CR^{24}-COO-R^{25}-A^5-Y^2-A^6-Y^3-A^7-Y^4-A^8-R^{26}-OCO-CR^{27}=CH_2 \quad (2B)$$

In the formulae (2A) and (2B), the respective symbols have the following meanings.

Each of $R^{21}$, $R^{24}$ and $R^{27}$ which are independent of one another, is a hydrogen atom or a methyl group.

Each of $R^{22}$, $R^{25}$ and $R^{26}$ which are independent of one another, is a single bond or a $C_{1-15}$ alkylene group, and such an alkylene group may have an etheric oxygen atom between carbon-carbon atoms in the alkylene group and at the terminal bonded to a cyclic group and may have a carboxy group at the terminal bonded to a cyclic group. Further, some or all of hydrogen atoms bonded to carbon atoms in this alkylene group may be substituted by fluorine atoms.

$R^{23}$ is a $C_{1-12}$ alkyl group, a $C_{1-12}$ alkoxy group, a $C_{1-12}$ alkylcarbonyloxy group or a fluorine atom, and in the case of the alkyl group, the alkoxy group or the alkylcarbonyloxy group, some or all of hydrogen atoms bonded to carbon atoms in such a group may be substituted by fluorine atoms.

Each of $Y^1$ and $Y^2$ which are independent of each other, is a single bond or —COO—; $Y^3$ is a single bond or —CH$_2$—CH$_2$—; and $Y^4$ is a single bond or —OCO—.

Each of $A^1$, $A^2$, $A^3$, $A^4$, $A^5$, $A^6$, $A^7$ and $A^8$ which are independent of one another, is a single bond, a trans-1,4-cyclohexylene group or a 1,4-phenylene group. However, one of $A^1$, $A^2$ and $A^3$ may be a naphthalene-1,4-diyl group, a naphthalene-1,5-diyl group, a naphthalene-2,6-diyl group or a trans-2,6-decahydronaphthalene group. In each of the combination of $A^1$, $A^2$, $A^3$ and $A^4$, and the combination of $A^5$, $A^6$, $A^7$ and $A^8$, which are independent of each other, single bonds are at most 2, and three 1,4-phenylene groups are not continuously linked. Further, some or all of hydrogen atoms of the trans-1,4-cyclohexylene group, the 1,4-phenylene group, the naphthalene-diyl group or the trans-2,6-decahydronaphthalene group, may be substituted by fluorine atoms or methyl groups.

The polymerizable liquid crystalline composition contains at least one type of the above polymerizable liquid crystalline compound, but may further contain a non-crystalline polymerizable compound or non-polymerizable compound as the case requires. The content of the polymerizable liquid crystalline compound in the polymerizable liquid crystalline composition is preferably at least 50 mass %, more preferably at least 80 mass %, based on the total amount of the polymerizable liquid crystalline composition.

As the non-crystalline polymerizable compound, a polymerizable chiral agent may be mentioned. By adding it to the polymerizable liquid crystalline composition, it is possible to obtain a polymerizable cholesteric liquid crystalline composition. Cholesteric liquid crystal has optical properties different from nematic liquid crystal or smectic liquid crystal, and therefore, by using a cholesteric liquid crystalline composition, it is possible to prepare an optical element which cannot be realized by a polymerizable liquid crystalline composition such as a nematic liquid crystalline composition or a smectic liquid crystalline composition.

Cholesteric liquid crystal is made of a laminate of many layers, and within one thin layer, liquid crystal molecules are aligned in a uniform direction with their long axes in parallel with the layer. Further, the direction of molecules is slightly different in every adjacent layer, and as a whole, it forms a helical structure. Thus, a crystalline compound exhibits a special optical property. Specifically, as a result of a helically twisted alignment of the liquid crystal compound, it selectively reflects one of right-handed/left-handed circularly polarized light components to correspond to the helical pitch. For example, when the transmittance of cholesteric liquid crystal is measured by using circularly polarized light showing selective reflection, it is possible to obtain a transmittance spectrum having sharp wavelength dependency i.e. a spectrum having a rectangular shape in the wavelength band region having the selective reflection. This property can be applied to e.g. a mirror to reflect light having a specific wavelength, a reflective diffraction grating or a circularly polarized light diffraction element by a refractive index anomalous dispersion utilizing the reflex band.

As such a polymerizable chiral agent, a conventional polymerizable chiral agent may be used without any particularly restriction. Specifically, monofunctional or bifunctional isosorbide derivative or isomannide derivative having the same one or two groups as the above-described groups having a radical polymerizable group, such as the groups represented by $R^4$ in the above polymer compound (1). Among such polymerizable chiral agents, in the present invention, polymerizable chiral agents made of the isosorbide derivatives or isomannide derivatives represented by the following formulae (C1-1) to (C1-4) are preferred.

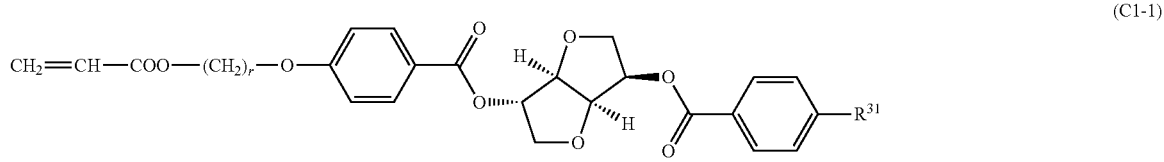

(C1-1)

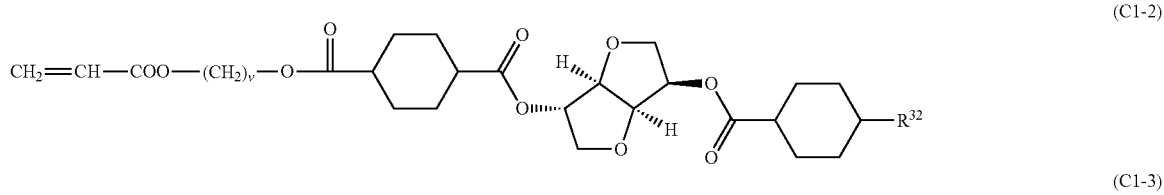

(C1-2)

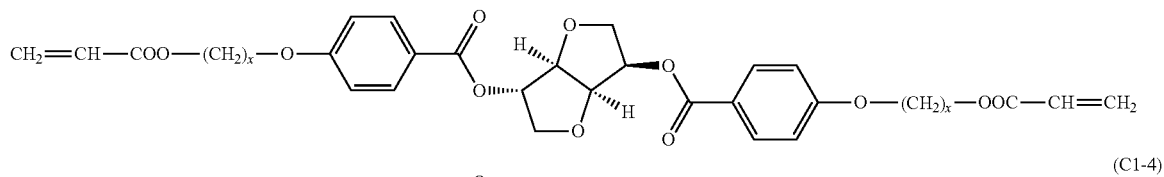

(C1-3)

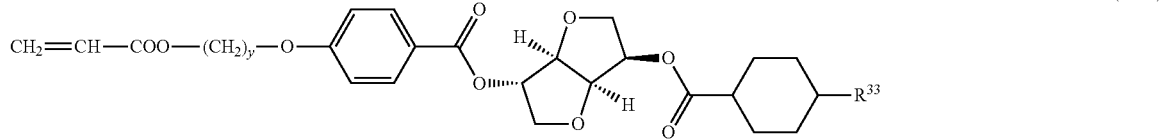

(C1-4)

In the above formulae, each of $R^{31}$ to $R^{33}$ which are independent of one another, is a linear or branched $C_{1-8}$ alkyl group, and each of r, v, x and y which are independent of one another, is an integer of from 2 to 8.

Further, in the case of using a polymerizable chiral agent, the content of the polymerizable chiral agent in the polymerizable liquid crystalline composition is preferably at most 50 mass %, more preferably at most 20 mass %, based on the total amount of the polymerizable liquid crystalline composition.

As the above-mentioned non-liquid crystalline non-polymerizable compound, for example, various additives such as a polymerization initiator, a polymerization inhibitor, a non-polymerizable chiral agent, an ultraviolet absorber, an antioxidant, a photostabilizer and a colorant, may be mentioned. The amount of such additives is preferably at most 5 mass %, more preferably at most 2 mass %, based on the total amount of the polymerizable liquid crystalline composition.

As the polymerization reaction by the polymerizable liquid crystalline compound in the polymerizable liquid crystalline composition, a photopolymerization reaction, a thermal polymerization reaction, etc. may be mentioned. A photopolymerization reaction is preferred in that the polymerizable liquid crystalline composition can easily be polymerized while maintaining the aligned state of the polymerizable liquid crystalline compound in a state where the polymerizable liquid crystalline composition shows a liquid crystal phase. As light to be used for the photopolymerization reaction, ultraviolet light or visible light is preferred. In the case of carrying out a photopolymerization reaction, it is preferred to employ a photopolymerization initiator. The photopolymerization initiator is suitably selected from e.g. acetophenones, benzophenones, benzoins, benzyls, Michler ketones, benzoin alkyl ethers, benzyl dimethyl ketals and thioxanthones, and one or more types may be used. The content of the photopolymerization initiator is preferably from 0.01 to 5 mass %, particularly preferably from 0.01 to 2 mass %, based on the total amount of the polymerizable liquid crystalline composition.

<Optical Element>

The optical element of the present invention has the above-described alignment film of the present invention and an optical anisotropic film containing a polymer obtainable by polymerizing the above polymerizable liquid crystalline composition in such a state that the composition shows a liquid crystal phase, and in such a state that the polymerizable liquid crystalline compound contained in the composition is aligned by the effect of the above alignment film. Here, by using the alignment film of the present invention, the polymerizable liquid crystalline compound is sufficiently uniaxially aligned in a direction substantially in parallel with the alignment film surface, and the optical anisotropic film is obtainable in a state that such an alignment is fixed.

Here, at the time of forming the optical anisotropic film, in order to maintain the polymerizable liquid crystalline composition to be in such a state that it shows a liquid crystal phase, the ambient temperature may be adjusted to be at most the transition temperature (Tc) ° C. in nematic phase-isotropic phase. However, since Δn of the polymerizable liquid crystalline composition becomes extremely small at a temperature close to Tc, the upper limit of the ambient temperature is preferably at most (Tc-10).

The optical element of the present invention may be prepared by e.g. the following methods (i) to (iii) by using the alignment film-attached substrate of the present invention prepared as described above, and the above polymerizable liquid crystalline composition.

(i) Method for Injection into Cell

A pair of alignment film-attached substrates of the present invention are prepared, and they were overlaid one on the other with a space so that the alignment films face each other, and bonded to form a cell. The film thickness of an optical anisotropic film to be obtained is controlled by the space between the pair of the alignment film-attached substrates. Here, at the time of preparing the cell, an opening is provided so that a polymerizable liquid crystalline composition can be filled therethrough from the outside.

Into the obtained cell, the polymerizable liquid crystalline composition is injected from the opening. For the injection, a vacuum injection method may be employed, or a method of utilizing a capillary phenomenon in the atmospheric air may be employed. Further, it is preferred that the polymerizable liquid crystalline composition is heated to a temperature of at least its Tc and then injected. When the polymerizable liquid crystalline composition is heated to at least its Tc, its viscosity decreases, and the injection time can be shortened. Further, when it is injected at a temperature lower than Tc, injection irregularity is likely to occur, and therefore, injection at a temperature of at least Tc is preferred. Further, in order to control polymerization of the polymerizable liquid crystalline composition, it is preferred to incorporate a polymerization inhibitor to the polymerizable liquid crystalline composition.

After injection of the polymerizable liquid crystalline composition into the cell, it is preferred to carry out annealing at a temperature at which alignment of the polymerizable liquid crystalline compound in the composition is possible, e.g. at a temperature of about (Tc-10)° C. for from 1 to 10 minutes, whereby the alignment degree of the compound can be increased. Thereafter, the polymerizable compound in the polymerizable liquid crystalline composition is polymerized by photopolymerization or thermal polymerization to obtain an optical anisotropic film. As the case requires, thermal treatment may further be carried out after the polymerization. An optical element thus obtained may be used, for example, in an application where no further processing is required, e.g. as a retardation plate.

Here, at the time of preparing the above cell, as one of the alignment film-attached substrates, one wherein the alignment film surface is subjected to release treatment may be used, and the pair of the substrates may be temporarily bonded, so that after forming the optical anisotropic film, the release-treated alignment film-attached substrate may be removed. An optical element thus obtained is an optical element of a structure having an optical anisotropic film on the alignment film surface of the alignment film-attached substrate of the present invention.

(ii) Melt Casting Method

A pair of alignment film-attached substrates of the present invention are prepared. On the alignment film surface of one of the substrates, the polymerizable liquid crystalline composition is dropped. At that time, the alignment film-attached substrate is preferably preliminarily heated to a temperature of at least Tc of the polymerizable liquid crystalline composition. Thereafter, another alignment film-attached substrate is overlaid on the above alignment film-attached substrate, so that the alignment film surface will be on the polymerizable liquid crystalline composition side. At that time, in order to make the space between the substrates to be constant, a spacer such as a silica spacer may be provided between the pair of substrates, as the case requires.

Then, it is preferred to carry out annealing at a temperature at which alignment of the polymerizable liquid crystalline compound in the polymerizable liquid crystalline composition is possible, e.g. at a temperature of about (Tc-10)° C. for from 1 to 10 minutes, whereby the alignment degree of the compound increases. Thereafter, the polymerizable compound in the polymerizable liquid crystalline composition is polymerized by photopolymerization or thermal polymerization to obtain an optical anisotropic film. As the case requires, heat treatment may further be carried out after the polymerization.

Also in this method, as one of the aligned film-attached substrates, one wherein the alignment film surface is subjected to release treatment, may be used, so that after forming the optical anisotropic film, the release treated alignment film-attached substrate may be removed. An optical element thus obtainable is an optical element of a structure having an optical anisotropic film on the alignment film surface of the alignment film-attached substrate of the present invention.

(iii) Liquid Casting Method

The polymerizable liquid crystalline composition is applied on the alignment film surface of an alignment film-attached substrate of the present invention. Then, it is preferred to carry out annealing at a temperature at which alignment of the polymerizable liquid crystalline compound in the polymerizable liquid crystalline composition is possible, e.g. at a temperature of about (Tc-10)° C. for from 1 to 10 minutes, whereby the alignment degree of the compound increases. Thereafter, in an oxygen-sealed state as the case requires, the polymerizable compound in the polymerizable liquid crystalline composition is polymerized by photopolymerization or thermal polymerization to obtain an optical anisotropic film. As the case requires, heat treatment may further be carried out after the polymerization.

As the method for applying the polymerizable liquid crystalline composition to the alignment film surface of the substrate, spin coating, die coating, extrusion coating, roll coating, wire bar coating, gravure coating, spray coating, dipping, printing, etc. may be mentioned.

Further, at the time of coating, an organic solvent may be added to the polymerizable liquid crystalline composition. The organic solvent may, for example, be ethyl acetate, tetrahydrofuran, toluene, hexane, methanol, ethanol, dimethylformamide, methylene chloride, isopropanol, acetone, methyl ethyl ketone, acetonitrile or cellosolve. These solvents may be used alone or in combination, and may suitably be selected in consideration of the vapor pressure and the solubility of the polymerizable liquid crystalline composition. Further, the amount of the organic solvent to be added is preferably at most 90 mass %, based on the total amount of the polymerizable liquid crystalline composition and the organic solvent. Further, as a method for evaporating the added organic solvent, natural drying, heat drying, vacuum drying or vacuum heat drying may be used. Here, drying is usually carried out before polymerization.

An optical element having a structure wherein an optical anisotropic film is formed on the alignment film surface of the alignment film-attached substrate of the present invention, thus obtained, is excellent in the adhesion between the alignment film and the optical anisotropic film, due to the property of the alignment film of the present invention and is a reliable optical element having a trouble such as peeling suppressed. Further, the alignment film of the present invention obtainable by using the polymer compound of the present invention, preferably the polymer compound (1), is one having mechanical strength and heat resistance, and in this respect, can contribute to an improvement in the reliability of an optical element.

The optical element of the present invention is an optical element having the alignment film of the present invention, usually the alignment film-attached substrate, and an optical anisotropic film formed on the alignment film surface, and as the case requires, may take a structure wherein electrodes are provided for the purpose of controlling the optical properties for a structure wherein a reflection film is provided for the purpose of using it as a reflective element. Further, depending upon the particular purpose, it is possible to provide a Fresnel lens structure, a grating for diffraction grating, a colored layer for color tone adjustment or a low reflective layer for suppressing stray light etc. on the optical element of the above structure.

The optical element of the present invention may have a construction wherein two such optical elements are combined. Further, the optical element of the present invention may be combined with another optical element such as a lens, a wavefront correction surface, a retardation plate, an iris or a diffraction grating, etc. In a case where two optical elements are combined, optical elements using two substrates may respectively be formed and then may be overlaid one on the other, or two layers of optical anisotropic films may be formed among three substrates.

In a case where such an optical element of the present invention is used, for example, for an optical information writing/reading device as described below, good light utilization efficiency can be obtained with its high reliability.

[Optical Information Writing/Reading Device]

The optical element of the present invention is useful as an optical information writing/reading device to record information on an optical recording medium and/or to reproduce information recorded on an optical recording medium. Specifically, the optical element of the present invention is preferably disposed as e.g. a diffraction grating such as a polarizing hologram, a retardation plate or a wavefront correction element, in an optical path of laser light of an optical information writing/reading device.

As a polarizing hologram, an example may be mentioned wherein light emitted from a laser light source is reflected from an information recording plane of an optical recording medium to generate signal light, and such signal light is separated and guided to a photodetector. Specifically, in an optical information writing/reading device provided with a diffraction grating such as a polarizing hologram prepared as an optical element of the present invention, light reflected from an optical recording medium is diffracted by a diffraction grating. Here, such an optical information writing/reading device may have, in addition to such a diffraction grating, a light source to generate light which enters into the diffraction grating, an object lens to focus light emitted from the light source to an optical recording medium, a detector to detect light reflected from the optical recording medium, etc.

Further, as a retardation plate, an example wherein it is used as a half wavelength plate to control the phase difference of light emitted from a laser light source, or an example wherein it is disposed as a quarter wavelength plate in an optical path in order to stabilize the output of a laser light source, may, for example, be mentioned. In a case where the optical information writing/reading device has a retardation plate prepared as the optical element of the present invention, such a retardation plate permits light from a light source to transmit therethrough and then plays a role of changing the polarization state of light reflected at an optical recording medium. For example, when the retardation plate is a quarter wavelength plate, the polarization state of light from a light source or light reflected at an optical recording medium is shifted by such a retardation plate to circularly polarized light or elliptically polarized light in the case of linearly polarized light, or to linearly polarized light in the case of circularly polarized light, in the polarization plane. Further, when the retardation plate is a half wavelength plate instead of the quarter wavelength plate, P polarized light is shifted to S polarized light, S polarized light is shifted to P polarized light, circularly polarized light (dextrorotation) to circularly polarized light (levorotation), and circularly polarized light (levorotation) is shifted to circularly polarized light (dextrorotation).

As a specific example, FIG. 1 shows an example of an optical information writing/reading device having the optical element of the present invention mounted as a retardation plate 4 having a phase difference of a quarter wavelength. In this optical information writing/reading device, information recorded on an optical recording medium is read out in the following manner.

Linearly polarized light emitted from a light source 1 is transmitted through a beam splitter 2, a collimator lens 3, a retardation plate 4 and an objective lens 5, and reaches an information recording plane of an optical recording medium 6. In this process, the linearly polarized light is transmitted through the beam splitter with its polarized direction unchanged, and is transformed into circularly polarized light by the retardation plate 4 having a phase difference of quarter wavelength. Thereafter, the light is reflected at the information recording plane of the optical recording medium 6 to be transformed into circularly polarized light of reverse roll, and traces back through the objective lens 5, the retardation plate 4 and the collimator lens 3 in this order through the returning path in the reverse order of the outgoing path. Here, by the retardation plate 4 in the returning path, the circularly polarized light is transformed into linearly polarized light orthogonal to the linearly polarized light before it is incident into the retardation plate 4. Accordingly, since the polarization direction of linearly polarized light in the returning path is different from that of the outgoing path by 90°, the propagation direction of the linearly polarized light in the returning path is turned by 90° when it passes through the beam splitter 2, and the light reaches a photodetector 7.

In the optical information writing/reading device shown in FIG. 1, instead of using a beam splitter 2, the optical element of the present invention may be disposed as a polarization-dependent diffraction grating. With such a construction, it is possible to increase the transmittance for light having a polarization direction of outgoing path, and it is possible to increase the diffraction efficiency of light having a polarization direction of returning path that is orthogonal to the polarization direction of outgoing path. Accordingly, it is possible to further improve the light utilization efficiency of the entire optical information writing/reading device.

In the foregoing, the optical element of the present invention has been described as applied to an optical information writing/reading device, but the optical element of the present invention is preferably used also in other applications, as a retardation plate or a light polarizer e.g. in an imaging element in an application to e.g. a projector, or in a communication device, etc. in an application to wavelength tunable filters, etc.

EXAMPLES

Now, the present invention will be described in further detail with reference to Examples, but it should be understood that the present invention is by no means limited to such Examples. Here, a number average molecular weight (Mn) was measured by means of a GPC apparatus (HLC8220, manufactured by TOSOH CORPORATION) using tetrahydrofuran (THF) as a solvent. Further, the compositional ratio of a copolymer was measured by means of $^1$H-NMR (AL400, manufactured by JEOL Ltd.) using deuterated chloroform as a solvent. Further, the phase transition temperature (Tc) of nematic phase-isotropic phase was measured by means of a thermal property automatic measuring system (FP900 thermosystem, manufactured by Mettler-Toledo) and a polarizing microscope. A retardation (Rd) was measured by means of a retardation measuring apparatus (RETS-100, manufactured by Otsuka Electronics Co., Ltd.).

Example 1

Preparation 1 of Polymer Compound (1)

(Step 1-1)
In accordance with the following reaction formula, compound (21) and compound (22) were polymerized to prepare compound (23-a).

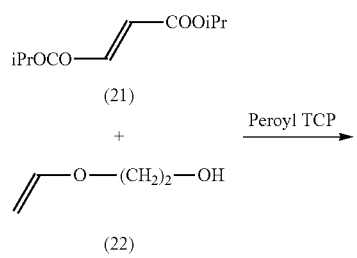

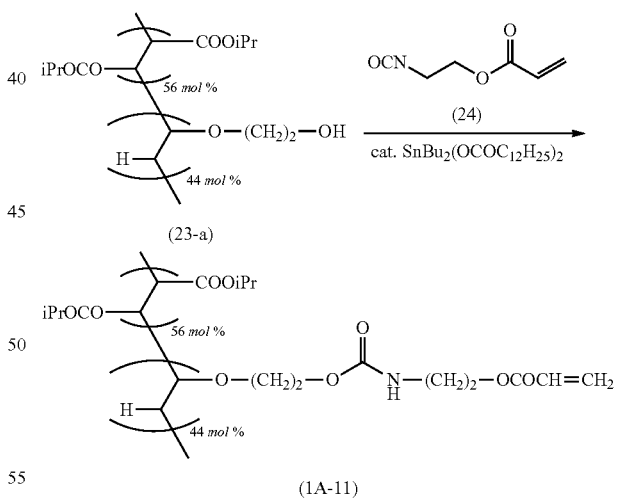

Into a 30 mL vial, 3.0 g (15.0 mmol) of diisopropyl fumarate (21), 0.57 g (6.4 mmol) of ethylene glycol monovinyl ether (22) and 10 mg of "Peroyl TCP" (tradename) manufactured by NOF Corporation were added and reacted at 40° C. for 16 hours. After completion of the reaction, the temperature was returned to room temperature, and the product was dissolved in 13 mL of THF and dropped into 250 mL of hexane. Precipitated solid was recovered by filtration and vacuum-dried to obtain 2.3 g of a polymer compound (23-a). The yield was 64%. The number average molecular weight (Mn) by GPC was 19,800. Further, in the polymer compound (23-a), the compositional ratio of polymerized units derived from diisopropyl fumarate (21) to polymerized units derived from ethylene glycol monovinyl ether (22) was 56 mol %:44 mol %, and this composition (mol %) is shown in the above formula.

(Step 1-2)
Then, using the polymer compound (23-a) obtained as described above, a compound (1A-11) as a polymer compound of the present invention was prepared in accordance with the following reaction formula.

Into a 50 mL eggplant-form flask, 0.5 g of the polymer compound (23-a) obtained in the above (Step 1-1) and 5 mL of THF were added, and further, in a nitrogen atmosphere, 0.11 mL (0.18 mmol) of di-n-butyltin dilaurate and 0.6 mL (4.5 mmol) of 2-isocyanatoethyl acrylate (24) were sequentially added at 0° C. The temperature was returned to room temperature, followed by stirring for 24 hours, and then, the reaction solution was dropped into 100 mL of distilled water. Precipitated solid was recovered by filtration and then dissolved in 5 mL of toluene and dropped into 250 mL of hexane, whereupon reprecipitated solid was collected by filtration and vacuum dried to obtain 0.36 g of a polymer compound (1A-11). The yield was 57%. In the obtained polymer compound (1A-11), the number average molecular weight (Mn) by GPC was 20,900. Further, in the polymer compound (1A-11), the compositional ratio of polymerized units (a1) derived from diisopropyl fumarate to polymerized units (a2) having a acryloxy group at the terminal of a side chain was 56 mol %:44 mol %, like the above polymer compound (23), and this composition (mol %) is shown in the above formula.

Example 2

Preparation 2 of Polymer Compound (1)

(Step 2-1)
In accordance with the following reaction formula, compound (21) and compound (22) were polymerized to prepare compound (23-b).

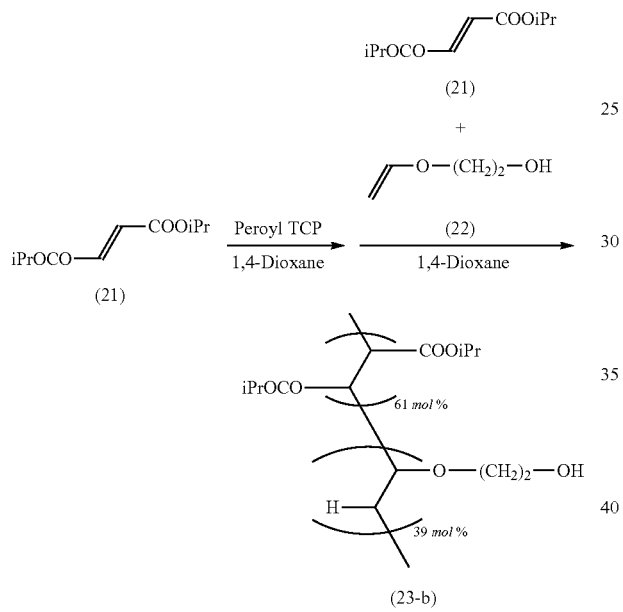

Into a 20 mL vial, 0.5 g (2.5 mmol) of diisopropyl fumarate (21), 0.3 g of 1,4-dioxane, and 25 mg of "Peroyl TCP" (tradename) manufactured by NOF Corporation were added and reacted at 50° C. for 1.5 hours. A mixed solution comprising 0.38 g (1.9 mmol) of diisopropyl fumarate (21), 0.16 g (1.9 mmol) of ethylene glycol monovinyl ether (22), and 0.3 g of 1,4-dioxane, was added thereto and further reacted at 50° C. for 16 hours. After completion of the reaction, the temperature was returned to room temperature, and 3 g of toluene was added for dissolution, whereupon the solution was dropped into 120 g of hexane. Precipitated solid was recovered by filtration and vacuum-dried to obtain 0.6 g of a polymer compound (23-b). The yield was 59%. The number average molecular weight (Mn) by GPC was 9,900. Further, in the polymer compound (23-b), the compositional ratio of polymerized units derived from diisopropyl fumarate (21) to polymerized units derived from ethylene glycol monovinyl ether (22) was 61 mol %:39 mol %, and this composition (mol %) is shown in the above formula.
(Step 2-2)
Then, using the polymer compound (23-b) obtained as described above, a compound (1A-12) as a polymer compound of the present invention was prepared in accordance with the following reaction formula.

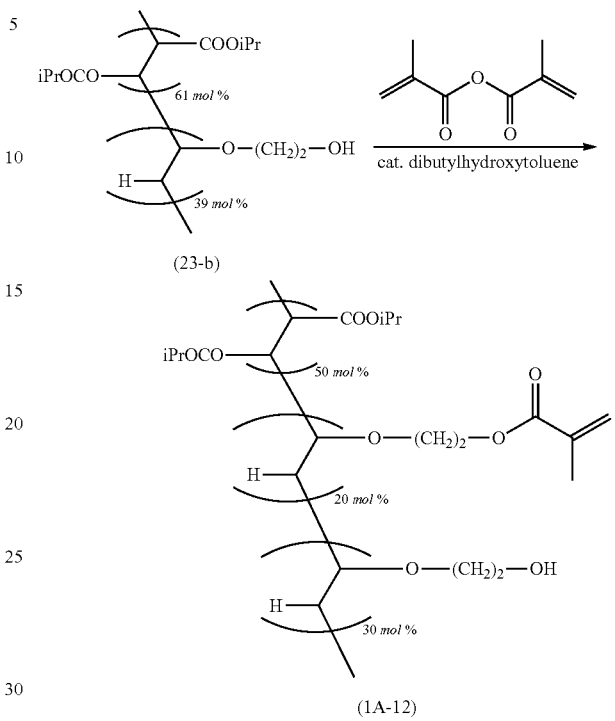

Into a 50 mL eggplant-form flask, 0.57 g of the polymer compound (23-b) obtained in the above (Step 2-1), 5.7 g of methacrylic anhydride, and a catalytic amount i.e. 26 mg of dibutylhydroxytoluene were added and reacted at 70° C. for 22 hours. After completion of the reaction, the reaction solution was dropped into 100 g of hexane, and precipitated solid was recovered by filtration, then dissolved in 2.5 g of pyridine and dropped into 60 g of distilled water, whereupon reprecipitated solid was recovered by filtration, again dissolved in 3 g of toluene and dropped into 60 g of hexane. Precipitated solid was recovered by filtration and then vacuum-dried to obtain 0.28 g of a polymer compound (1A-12). The yield was 48%. The number average molecular weight (Mn) by GPC was 12,300. Further, in the polymer compound (1A-12), the compositional ratio of polymerized units (a1) derived from diisopropyl fumarate, polymerized units (a2) having a methacryloxy group at the terminal of a side chain and polymerized units (a3) derived from ethylene glycol monovinyl ether (22) was 50 mol %:20 mol %:30 mol %, and this composition (mol %) is shown in the above formula.

Here, in the above reaction formulae, between the polymer compound (23-b) as the starting material and the polymer compound (1A-12) as the reaction product, polymerized units derived from diisopropyl fumarate not contributed to the reaction decreased from 61 mol % to 50 mol %. This decrease is attributable to the fact that in the reaction process, only the homopolymer of diisopropyl fumarate was isolated.

Example 3

Preparation 3 of Polymer Compound (1)

(Step 3-1)
In accordance with the following reaction formula, compound (24) and compound (25) were reacted to prepare compound (26).

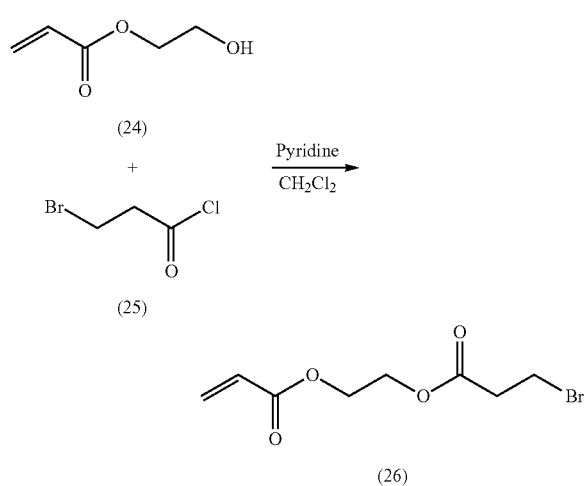

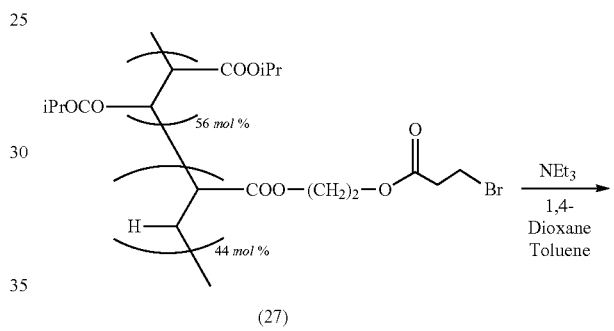

Into a 500 mL three necked flask, 7.0 g (60.3 mmol) of hydroxyethyl acrylate (24), 200 mL of dichloromethane, and 5.36 mL (66.3 mmol) of pyridine were added, and in a nitrogen stream, 6.08 mL (60.3 mmol) of 3-bromobutyryl chloride (25) was dropped while cooling with ice so that the internal temperature did not exceed 20° C., and stirring was carried out at room temperature for 5 hours. After completion of the reaction, dichloromethane was removed under reduced pressure, and the product was purified by column chromatography using hexane/ethyl acetate (4:1 by weight ratio) as a developer to obtain 7.5 g of an acrylate compound (26). The yield was 50%.

(Step 3-2)

Then, in accordance with the following reaction formula, compound (21) and the acrylate compound (26) obtained as described above, were polymerized to obtain a polymer compound (27).

Into a 20 mL vial, 0.8 g (4.0 mmol) of diisopropyl fumarate (21), 0.4 g of 1,4-dioxane, and 40 mg of dimethyl 2,2'-azobis (2-methyl propionate) (MAIB) were added and reacted at 70° C. for 1.5 hours. Then, a mixed solution comprising 0.43 g (1.9 mmol) of the acrylate compound obtained as described above, and 0.3 g of 1,4-dioxane was added, and further reacted at 70° C. for 3.5 hours. After completion of the reaction, the temperature was returned to room temperature, and 5 g of toluene was added for dissolution, whereupon the solution was dropped into 180 g of methanol. Precipitated solid was recovered by filtration and vacuum-dried to obtain 0.65 g of a polymer compound (27). The yield was 53%. The number average molecular weight (Mn) by GPC was 19,600. Further, in the polymer compound (27), the compositional ratio of polymerized units derived from diisopropyl furnarate (21) to polymerized units derived from the acrylate compound (26) obtained as described above, was 56 mol %:44 mol %, and this composition (mol %) is shown in the above formula.

(Step 3-3)

Then, using the polymer compound (27) obtained in the above (Step 3-2), a compound (1A-13) as a polymer compound of the present invention was prepared in accordance with the following reaction formula.

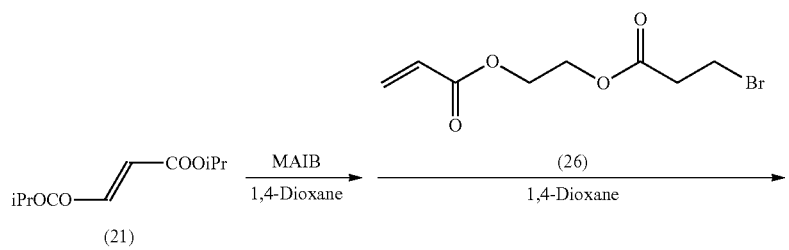

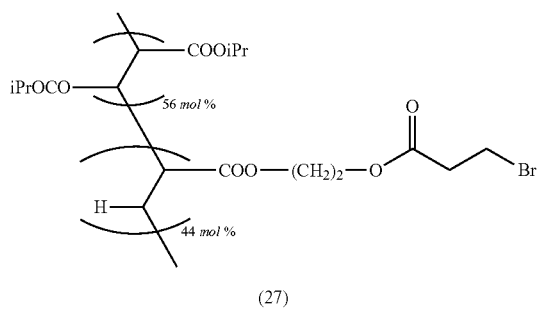

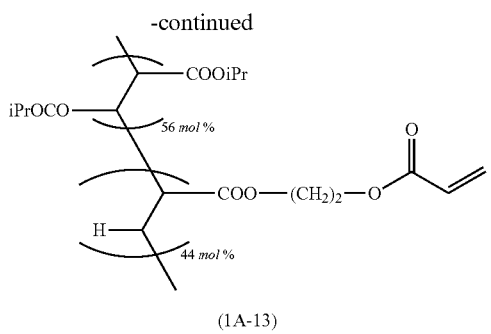

(1A-13)

Into a 50 mL eggplant-form flask, 0.6 g of the polymer compound (27) obtained as described above, 5.4 g of 1,4-dioxane, and 6.0 g of toluene were added and heated at 80° C. to dissolve the polymer compound (27). After returning the temperature to room temperature, 0.51 mL of triethylamine was dropped, and stirring was carried out at room temperature for 14 hours. After completion of the reaction, the reaction solution was dropped into 200 g of methanol, and precipitated solid was recovered by filtration, then dissolved in 5 g of THF, and the solution was dropped into 120 g of distilled water, whereupon reprecipitated solid was recovered by filtration and washed with methanol and vacuum-dried to obtain 0.17 g of a polymer compound (1A-13). The yield was 32%. The number average molecular weight (Mn) by GPC was 21,400. Further, in the polymer compound (1A-13), the compositional ratio of polymerized units (a1) derived from diisopropyl fumarate to polymerized units (a2) having an acryloxy group at the terminal of a side chain was 56 mol %:44 mol %, like the above polymer compound (27), and this composition (mol %) is shown in the above formula.

Example 4

(Step 4-1)

In accordance with the following reaction formula, compound (21) and acrylate compound (26) were polymerized to prepare polymer compound (28).

Into a 30 mL vial, 5.0 g (25.0 mmol) of diisopropyl fumarate (21), and 250 mg of dimethyl 2,2'-azobis(2-methyl propionate) (MAIB) were added in a nitrogen atmosphere, and reacted at 70° C. for 50 minutes. Then, a $N_2$ substituted mixed solution comprising 0.94 g (4.2 mmol) of the acrylate compound (26) obtained as described above and 0.72 g of 1,4-dioxane, was added, and a reaction was further carried out at 70° C. for 120 minutes. After completion of the reaction, the temperature was returned to room temperature, and 7.0 g of THF was added for dissolution, and the solution was dropped into 160 g of methanol. Precipitated solid was recovered by filtration, washed with 70 g of methanol and then vacuum-dried to obtain 2.95 g of a polymer compound (28). The yield was 50%. The number average molecular weight (Mn) by GPC was 28,100. Further, in the polymer compound (28), the compositional ratio of polymerized units derived from diisopropyl fumarate (21) to polymerized units derived from the acrylate compound (26) obtained as described above, was 86 mol %:14 mol %, and this composition (mol %) is shown in the above formula.

(Step 4-2)

Then, using the polymer compound (28) obtained in the above (Step 4-1), a compound (1A-14) as a polymer compound of the present invention was prepared in accordance with the following reaction formula.

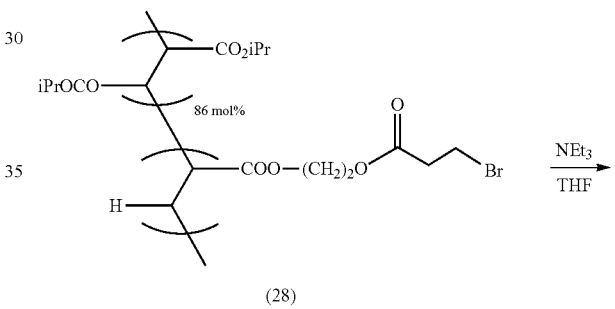

(28)

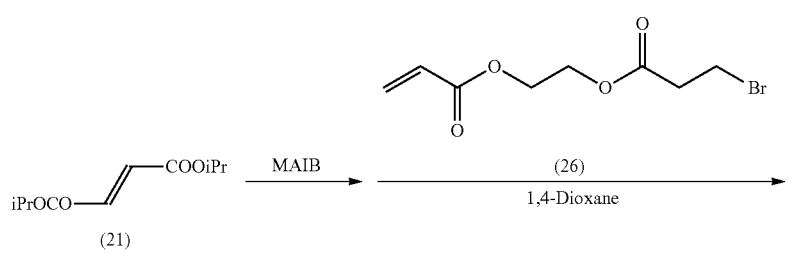

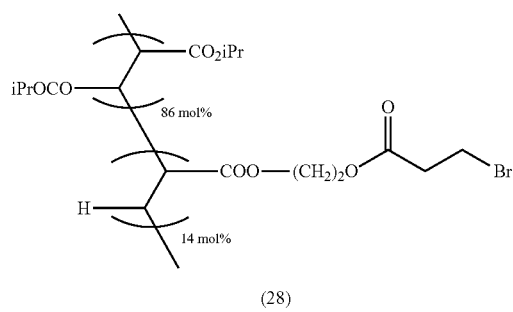

(28)

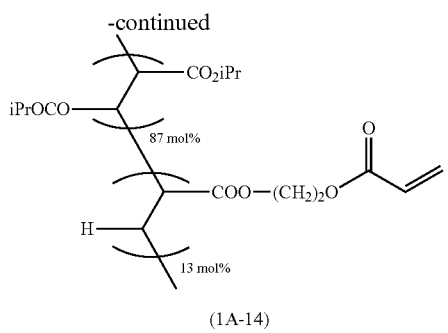

(1A-14)

Into a 50 mL eggplant-form flask, 1.5 g of the polymer compound (28) obtained as described above, and 10.8 g of tetrahydrofuran (THF) were added and heated at 80° C. to dissolve the polymer compound (28). After returning the temperature to room temperature, 0.59 g of triethylamine was dropped, and a reaction was carried out with stirring at room temperature for 5 hours. After completion of the reaction, while filtering the formed salt, the reaction solution was dropped into 200 mL of a mixed solution of methanol/distilled water=3/1, and precipitated solid was recovered by centrifugal separation. The solid was again washed with the above mixed solution, then recovered by filtration and vacuum-dried to obtain 1.11 g of a polymer compound (1A-14). The yield was 87%. The number average molecular weight (Mn) by GPC was 29,100. Further, in the polymer compound (1A-14), the compositional ratio of polymerized units (a1) derived from diisopropyl fumarate to polymerized units (a2) having an acryloxy group at the terminal of a side chain, is 87 mol %:13 mol %, and this composition (mol %) is shown in the above formula.

Example 5

Preparation of Alignment Film-Attached Substrate

On a 6 inch quartz substrate treated with "KBM-503" (tradename) manufactured by Shin-Etsu Chemical Co., Ltd., a composition for an alignment film obtained by dissolving 0.05 g of the polymer compound (1A-11) obtained in the above Example 1 in 5 g of toluene, was applied by spin coating at 3,000 rpm for 30 seconds and then dried at 100° C. for 30 minutes to obtain a polymer thin film on the quartz substrate. This thin film was subjected to rubbing treatment with a nylon cloth in a constant direction with a torque of 4 kgf/cm² to prepare an alignment film-attached substrate 1.

Examples 6 and 7

Preparation of Optical Element

A pair of alignment film-attached substrates 1 obtained in Example 5 were bonded by an adhesive so that the alignment-treated alignment film surfaces faced each other, thereby to obtain a cell 1. Glass beads having a diameter of 5.3 μm were added to the adhesive to adjust the distance between the pair of alignment film-attached substrates 1 to be 5.3 μm.

Then, five polymerizable liquid crystalline compounds (4-1) to (4-5) represented by the following structural formulae, were mixed in a ratio of (4-1):(4-2):(4-3):(4-4):(4-5)=7.5:7.5:22.5:22.5:40 (molar ratio) to obtain a mixture, to which a polymerization initiator was added in an amount of 0.1 mass % based on this mixture to obtain a polymerizable liquid crystalline composition A (Tc=76° C.).

Further, using "LC242" (tradename) manufactured by BASF as a polymerizable liquid crystalline compound, a polymerization initiator was added in an amount of 0.1 mass % based on this polymerizable liquid crystalline compound to obtain a polymerizable liquid crystalline composition B (Tc=120° C.). Here, as the photopolymerization initiator "DAROCUR TPO" (tradename) manufactured by Ciba Specialty Chemicals was used in each of the above polymerizable liquid crystalline compositions A and B.

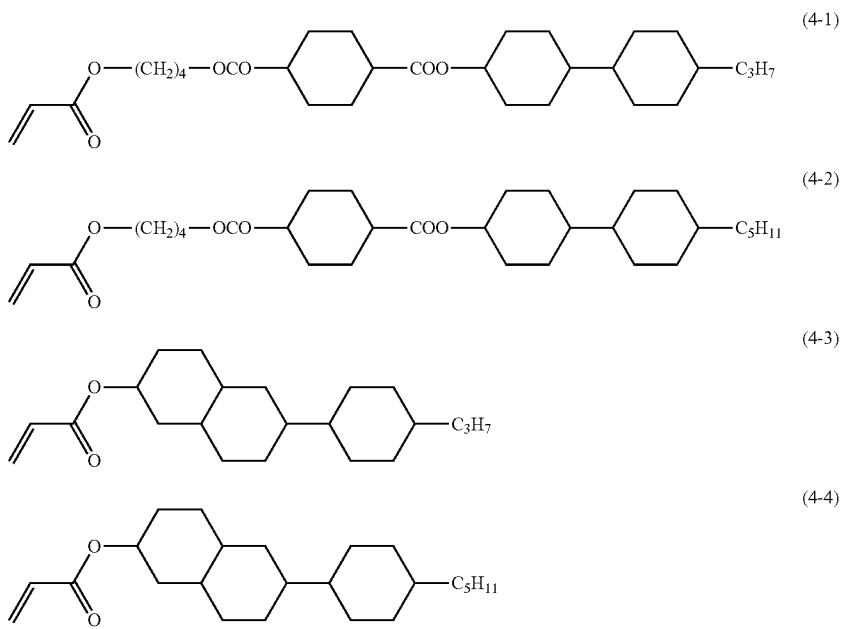

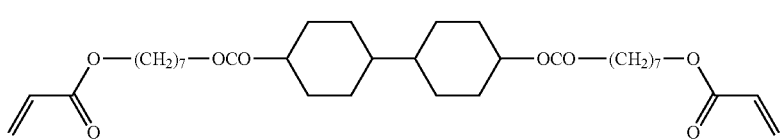

(4-5)

Then, into the cell 1 prepared as described above, the polymerizable liquid crystalline composition A was injected at a temperature of 90° C., and the temperature was lowered to 65° C., whereupon by observation using crossed Nicols, the polymerizable liquid crystalline composition A was found to be uniaxially aligned in the rubbing direction of the substrate.

Into the cell 1 prepared in the same manner as above, the polymerizable liquid crystalline composition B was injected at a temperature of 120° C., and the temperature was lowered to 30° C., whereupon by observation using crossed Nicols, the polymerizable liquid crystalline composition B was found to be uniaxially aligned in the rubbing direction of the substrate.

Thereafter, they were irradiated with ultraviolet rays at an intensity of 50 mW/cm$^2$ at 65° C. so that the integrated light amount would be 9,000 mJ/cm$^2$, to carry out photopolymerization thereby to obtain optical element A1 and optical element B1.

In optical element A1 and optical element B1, liquid crystals were found to be uniaxially aligned in the rubbing direction of the substrates by observation using crossed Nicols. Further, each of optical element A1 and optical element B1 was transparent in the visible range, and no light scattering was observed.

Further, optical element A1 had Rd of 202.2 nm to laser light with a wavelength of 405 nm and Rd of 197.5 nm to laser light with a wavelength of 660 nm. Optical element B1 had Rd of 751.3 nm to laser light with a wavelength of 405 nm and Rd of 638.8 nm to laser light with a wavelength of 660 nm.

Example 8

Preparation of Cholesteric Liquid Crystal Composition and Preparation of Optical Element To the polymerizable liquid crystalline composition B prepared in Example 7, a polymerizable chiral agent represented by the following formula (7-1) was added in an amount of 10.18 mass % based on the above polymerizable liquid crystalline composition B to obtain a cholesteric liquid crystal composition C.

mW/cm$^2$ at 35° C. so that the integrated light amount would be 23,400 mJ/cm$^2$ to carry out photopolymerization thereby to obtain optical element C1.

Figure 2:
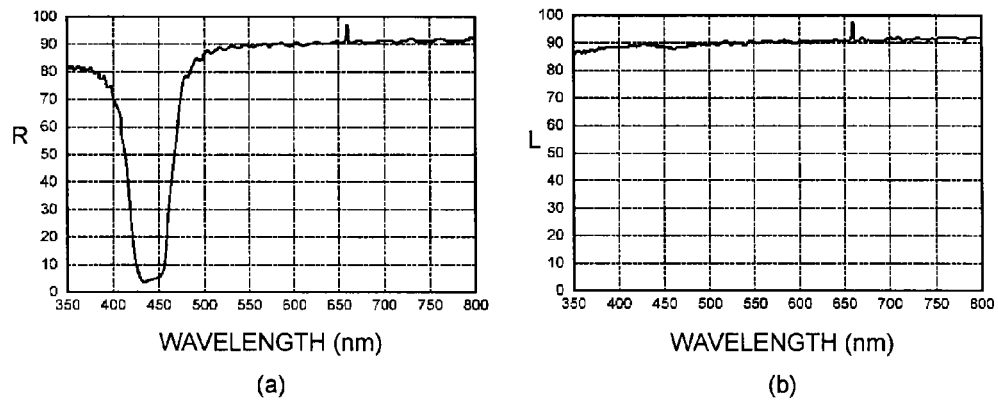
FIGS. 2(a) and (b) are graphs showing transmittance spectra in right-handed and left-handed circular polarization by optical element C1 obtained in Examples.

FIGS. 2(*a*) and (*b*) show spectra of light transmittance in right-handed and left-handed circular polarization in a certain wavelength range of optical element C1. FIG. 2(*a*) is a spectrum of light transmittance by right-handed circular polarization, and FIG. 2(*b*) is a spectrum of light transmittance by left-handed circular polarization. From these results, it is evident that while the spectrum of light transmittance by right-handed circular polarization has a downwardly large selective reflection zone, the spectrum of light transmittance by left-handed circular polarization does not have any particular reflection zone in the entire measured wavelength range. These results indicate that in optical element C1, the cholesteric liquid crystal composition C is polymerized in a state where the selective reflection zone is well maintained.

These are the same results as the after-described optical element having a cholesteric liquid crystal layer obtainable by using a polyimide alignment film, and the alignment film by the polymer compound of the present invention is excellent in the aligning performance in the same manner as the polyimide alignment film.

Here, the above measurement of spectra of light transmittance was carried out in such a manner that non-polarized light emitted from a power source is passed through a polarizer installed at the front of the light source to take out linearly polarized light, and this linearly polarized light is permitted to enter into a λ/4 wavelength plate at a prescribed angle for polarization transformation (right-handed circular polarization or left-handed circular polarization), and this polarized light is transmitted through a measured sample, whereby the obtained transmitted light is measured by a spectrometer.

Comparative Examples 1 to 3

Preparation of Alignment Film-Attached Substrate and Optical element

To a 6 inch quartz substrate, a polyimide solution (SE510 (tradename) manufactured by Nissan Chemical Industries, Ltd.) was applied by a spin coater and dried, and then, the

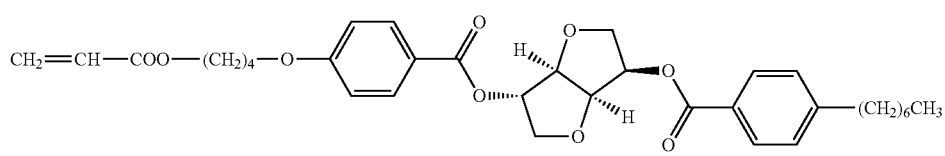

(7-1)

Then, into the cell 1 prepared in the same manner as in Example 6, the cholesteric liquid crystal composition C was injected at a temperature of 90° C., and the temperature was lowered to 35° C., whereby the polymerizable liquid crystalline composition C showed a stabilized cholesteric phase. Then, ultraviolet rays were applied with an intensity of 130 obtained thin film was subjected to rubbing treatment with a nylon cloth in a constant direction with a torque of 4 kgf/cm$^2$ to obtain an alignment film-attached substrate 2 of Comparative Example.

A pair of such alignment film-attached substrates 2 were bonded by an adhesive so that the alignment film surfaces subjected to alignment treatment faced each other to form a cell 2, and three such cells 2 were prepared. To the adhesive, glass beads having a diameter of 5.3 μm were added to adjust the distance between the pair of aligned film-attached substrates 2 to be 5.3 μm.

Then, in the same manner as in Example 6 except that instead of the cell 1, the cell 2 was used, the polymerizable liquid crystalline composition A, the polymerizable liquid crystalline composition B and the cholesteric liquid crystal composition C were, respectively, injected into the above-mentioned three cells 2 and polymerized to obtain optical elements A2, B2 and C2, respectively.

In optical element A2 and optical element B2 thus obtained, liquid crystals were found to be uniaxially aligned in the rubbing direction of the substrates, by observation using crossed Nicols. Further, each of optical element A2 and optical element B2 was transparent in a visible range, and no light scattering was observed.

Further, optical element A2 had Rd of 226.1 nm to laser light with a wavelength of 405 nm and Rd of 220.9 nm to laser light with a wavelength of 660 nm. Further, optical element B2 had Rd of 749.7 nm to laser light with a wavelength of 405 nm and Rd of 638.1 nm to laser light with a wavelength of 660 nm.

Figure 3:
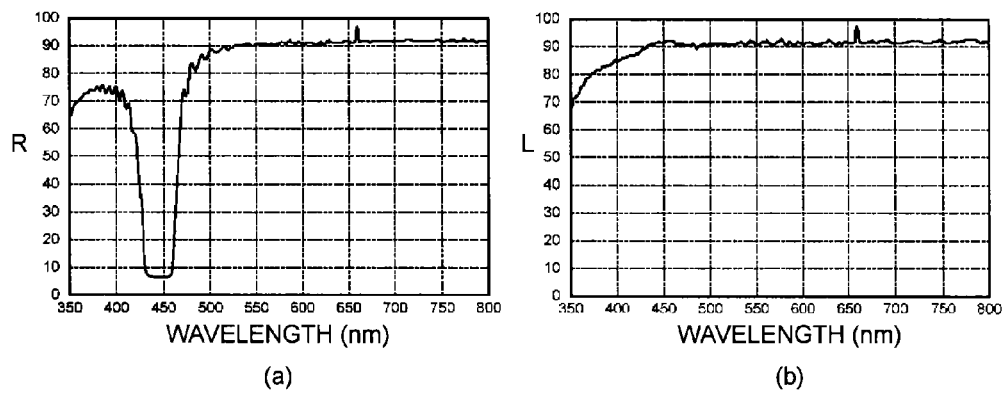
FIGS. 3(a) and (b) are graphs showing transmittance spectra in right-handed and left-handed circular polarization by optical element C2 obtained in Comparative Examples.

FIGS. 3(a) and (b) show spectra of light transmittance in right-handed and left-handed circular polarization in a certain wavelength range of optical element C2. FIG. 3(a) is a spectrum of light transmittance by right-handed circular polarization, and FIG. 3(b) is a spectrum of light transmittance by left-handed circular polarization. From these results, it is evident that while the spectrum of light transmittance by right-handed circular polarization has a downwardly large selective reflection band, the spectrum of light transmittance by left-handed circular polarization does not have any particular reflection band in the entire measured wavelength range. These results indicate that in optical element C2, the cholesteric liquid crystal composition C is polymerized in a state where the selective reflection band is well maintained.

<Evaluation of Adhesion>

(1) Preparation of Sample for Evaluation

The alignment film-attached substrate 1 obtained in Example 5 and a similar alignment film-attached substrate 1' having release treatment applied to such an alignment film, were bonded by an adhesive in the same manner as in Example 6 to form a cell 3, and three such cells 3 were prepared. To the adhesive, glass beads having a diameter of 5.3 μm were added to adjust the distance between the two alignment film-attached substrates 1 and 1' to be 5.3 μm.

Using the alignment film-attached substrate 2 obtained in Comparative Example instead of the alignment film-attached substrate 1 obtained in Example 5, three cells 4 were prepared in the same manner as above by using this substrate 2 and the alignment film-attached substrate 2' having release treatment applied to such an alignment film.

Then, into the three cells 3, the polymerizable liquid crystalline composition A, the polymerizable liquid crystalline composition B and the cholesteric liquid crystal composition C were, respectively, injected and photopolymerized in the same manner as in Example 6 to obtain optical elements A3, B3 and C3 of Examples.

In the same manner, into the three cells 4, the polymerizable liquid crystalline composition A, the polymerizable liquid crystalline composition B and the cholesteric liquid crystal composition C were, respectively, injected and photopolymerized in the same manner as in Example 5 to obtain optical elements A4, B4 and C4 of Comparative Examples.

By removing the substrate having release treatment applied, from optical element A3, and the adhesion test was carried out in accordance with JIS K5600-5-6, Part 5, Section 6: Adhesion (crosscut method). Here, as the tape, "Scotch Hatte Hagaseru Tape" (tradename) manufactured by 3M was used. Similar adhesion tests were carried out also with respect to optical elements B3 and C3 of Examples and optical elements A4, B4 and C4 of Comparative Examples.

With respect to optical elements A3, B3 and C3 using the alignment film-attached substrate 1 obtained in Example 5, each of the test results was classified into "1", whereby good adhesion was confirmed.

On the other hand, when substrate 2' having release treatment applied, was removed from optical elements A4, B4 and C4 using alignment film-attached substrate 2 obtained in Comparative Example, in each case, peeling was observed at the interface between the polyimide and the liquid crystalline composition polymer. Here, with respect to optical elements A4, B4 and C4, each of the above test results was classified into "5", and thus the adhesion was inadequate.

Further, the alignment film prepared by using the polymer compound of the present invention is made of a compound having polymerized units derived from a fumaric acid diester in its molecule, whereby it is considered to have mechanical strength and heat resistance similar to a conventional alignment film made of a fumaric acid diester polymer.

INDUSTRIAL APPLICABILITY

The alignment film prepared by using the polymer compound of the present invention has mechanical strength and heat resistance and has a sufficient aligning performance to a liquid crystalline compound and further is excellent also in adhesion with an optical anisotropic film obtained by aligning a liquid crystalline compound, particularly an optical anisotropic film containing a polymer of a polymerizable liquid crystalline compound polymerized in an aligned state. Accordingly, an optical element using the alignment film prepared by utilizing the polymer compound of the present invention can be effectively used as a diffraction element, a retardation plate, etc. to be utilized for an optical information writing/reading device, a liquid crystal display device, a communication device, etc.

The entire disclosure of Japanese Patent Application No. 2011-093096 filed on Apr. 19, 2011 including specification, claims, drawings and summary is incorporated herein by reference in its entirety.

REFERENCE SYMBOLS

1: light source, 2: beam splitter, 3: collimator lens, 4: retardation plate, 5: objective lens, 6: optical recording medium, 7: photodetector

What is claimed is:

1. A polymer compound comprising polymerized units derived from a fumaric acid diester and polymerized units having a radical polvmerizable group in a side chain which is represented by the following formula (1):

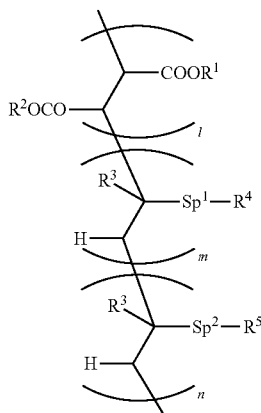

(1)

wherein each of $R^1$ and $R^2$ which are independent of each other, is a $C_{1-12}$ linear, branched or cyclic alkyl group which may have an etheric oxygen atom between carbon-carbon atoms, and some or all of the hydrogen atoms may be substituted by fluorine atoms;

$R^3$ is a hydrogen atom, a methyl group or a fluorine atom;

each of $Sp^1$ and $Sp^2$ which are independent of each other, is a single bond or a $C_{1-12}$ hydrocarbon group which may have, between carbon-carbon atoms and at the terminal on the main chain side, an ether bond, a sulfide bond, an ester bond, an amido bond, a thioester bond, a thioamido bond, a dithiocarboxylate ester bond, a carbonate ester bond, a urethane bond, a urea bond, an amino group, —O—CH$_2$—CH(OH)—CH$_2$—OCO— or —COO—CH$_2$—CH(OH)—CH$_2$—O—, and some or all of the hydrogen atoms may be substituted by fluorine atoms;

$R^4$ is a monovalent organic group having a radical polymerizable group at its terminal;

$R^5$ is a hydroxy group, an amino group, a mercapto group, a carboxy group or a glycidyloxy group; and l, m and n represent mol %, and l+m+n=100, $30 \leq l \leq 95$, $5 \leq m \leq 70$, and $0 \leq n \leq 30$.

2. The polymer compound according to claim 1, wherein in the formula (1), $Sp^1$ is represented by the following formula (2-1), $Sp^2$ is represented by the following formula (2-2), and $R^4$ is a group represented by a formula selected from the group consisting of the following formulae (3-1) to (3-6):

(2-1)

(2-2)

wherein W is a single bond, an ether bond, a sulfide bond, an ester bond, an amido bond, a thioester bond or an amino group;

each of $R^{11}$ and $R^{12}$ which are independent of each other, is a $C_{0-12}$ bivalent hydrocarbon group, of which some or all of the hydrogen atoms may be substituted by fluorine atoms, and which may have, between carbon-carbon atoms and at the terminal on the main chain side, a phenylene group or an etheric oxygen atom;

Z is a single bond, an ether bond, a sulfide bond, an ester bond, an amido bond, a thioester bond, a thioamido bond, a dithiocarboxylate ester bond, a carbonate ester bond, a urethane bond, a urea bond, an amino group, —O—CH$_2$—CH(OH)—CH$_2$—OCO— or —COO—CH$_2$—CH(OH)—CH$_2$—O—, and s is an integer of from 0 to 6, and the sum of values obtained by the number of carbon atoms in $R^{11}$ and multiplying the number of carbon atoms in $R^{12}$ by s is from 0 to 12;

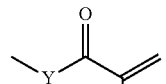

(3-1)

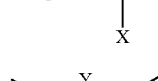

(3-2)

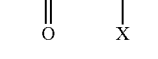

(3-3)

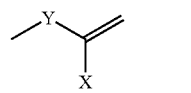

(3-4)

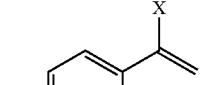

(3-5)

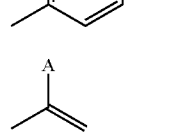

(3-6)

wherein X is a hydrogen atom, a fluorine atom or a methyl group, Y is an oxygen atom, a sulfur atom or an amino group (—NH—), and A is a hydrogen atom, a chlorine atom or a cyano group.

3. The polymer compound according to claim 2, wherein W in the formulae (2-1) and (2-2) is a single bond, an ether bond or an ester bond, and Z in the formula (2-1) is a single bond, an ether bond, a sulfide bond, an ester bond, an amido bond, a thioester bond, a carbonate ester bond, a urethane bond, a urea bond, —O—CH$_2$—CH(OH)—CH$_2$—OCO— or —COO—CH$_2$—CH(OH)—CH$_2$—O—.

4. The polymer compound according to claim 1, wherein in the formula (1), each of $R^1$ and $R^2$ which are independent of each other, is a $C_{3-12}$ branched or cyclic alkyl group which may have an etheric oxygen atom between carbon-carbon atoms, and some or all of the hydrogen atoms may be substituted by fluorine atoms.

5. The polymer compound according to claim 1, wherein in the formula (1), $R^4$ is a group represented by the following formula (3-11), (3-21), (3-4), (3-51), (3-52) or (3-61):

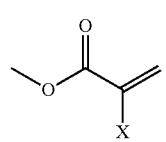

(3-11)

-continued

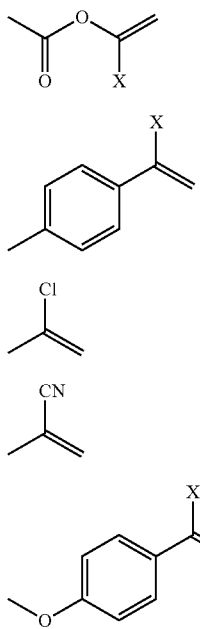

(3-21)

(3-4)

(3-51)

(3-52)

(3-61)

wherein X is a hydrogen atom, a fluorine atom or a methyl group.

6. The polymer compound according to claim 1, wherein in the formula (1), $R^1$ and $R^2$ are the same group.

7. The polymer compound according to claim 1, wherein in the formula (1), $R^4$ is an acryloxy group or a methacryloxy group.

8. A composition for an alignment film containing the polymer compound as defined in claim 1.

9. An alignment film obtained by subjecting a thin film formed by using the position for an alignment film as defined in claim 8 to alignment treatment.

10. An optical element having the alignment film as defined in claim 9 and an optical anisotropic film containing a polymer obtainable by polymerizing at least one polymerizable liquid crystalline compound in an aligned state.

11. The optical element according to claim 10, wherein the polymer contains polymerized units of a polymerizable liquid crystalline compound having at least two polymerizable groups.

12. An optical information writing/reading device for writing information on an optical recording medium and/or reading information recorded on an optical recording medium, which has the optical element as defined in claim 10.

* * * * *